United States Patent
Hayashi et al.

(10) Patent No.: US 7,602,801 B2
(45) Date of Patent: Oct. 13, 2009

(54) PACKET PROCESSING DEVICE AND METHOD

(75) Inventors: Shigeo Hayashi, Tokoname (JP); Eiji Watanabe, Kasugai (JP); Hidekatsu Ozeki, Gifu (JP)

(73) Assignee: Panasonic Corporation, Osaka (JP)

( * ) Notice: Subject to any disclaimer, the term of this patent is extended or adjusted under 35 U.S.C. 154(b) by 480 days.

(21) Appl. No.: 10/528,839

(22) PCT Filed: Jun. 7, 2004

(86) PCT No.: PCT/JP2004/008240

§ 371 (c)(1),
(2), (4) Date: Mar. 23, 2005

(87) PCT Pub. No.: WO2004/112255

PCT Pub. Date: Dec. 23, 2004

(65) Prior Publication Data

US 2006/0067345 A1 Mar. 30, 2006

(30) Foreign Application Priority Data

Jun. 16, 2003 (JP) .............................. 2003-171143

(51) Int. Cl.
*H04L 12/54* (2006.01)
(52) U.S. Cl. ...................................... 370/429; 370/474
(58) Field of Classification Search ................. 370/389, 370/412, 413, 415, 429, 535, 474, 509; 725/151; 375/240.15, 240.26, 240; 709/230, 108, 709/236

See application file for complete search history.

(56) References Cited

U.S. PATENT DOCUMENTS 5,559,999 A * 9/1996 Maturi et al. ................ 713/400

(Continued)

FOREIGN PATENT DOCUMENTS

EP 0798932 A2 * 10/1997

(Continued)

OTHER PUBLICATIONS

Implementation of MPEG transport demultiplexer with a RISC-based microcontroller; Fujii, Y.; Nakase, J.; Matsuno, K.; Gunji, H.; Consumer Electronics, IEEE Transactions on vol. 42, Issue 3, Aug. 1996 pp. 431-438.*

*Primary Examiner*—Edan Orgad
*Assistant Examiner*—Salman Ahmed
(74) *Attorney, Agent, or Firm*—Wenderoth, Lind & Ponack, L.L.P.

(57) ABSTRACT

There is provided a packet processing device for, when decoding variable length data that is split into packets, realizing a reduction in processing load at a decoder, by providing information for identifying a start position of the data. A header analyzing section (11) determines whether data stored in a packet is start data containing start information or other data. A data extracting section (12) extracts data from a packet and stores the data in a buffer (13). A buffer controlling section (14) causes a start position memory (15) and a number-of-starts counter (16) to retain an address position and the number of start data stored in the buffer (13). A decode section (20) refers to the start position memory (15) and the number-of-starts counter (16) and executes a decode process for the data stored in the buffer (13).

11 Claims, 27 Drawing Sheets

U.S. PATENT DOCUMENTS

| | | | | |
|---|---|---|---|---|
| 5,579,052 | A | * 11/1996 | Artieri | 375/240.15 |
| 5,818,539 | A | * 10/1998 | Naimpally et al. | 348/512 |
| 5,832,445 | A | * 11/1998 | Gao et al. | 704/200.1 |
| 5,960,006 | A | * 9/1999 | Maturi et al. | 370/509 |
| 6,483,543 | B1 | * 11/2002 | Zhang et al. | 348/390.1 |
| 6,704,794 | B1 | * 3/2004 | Kejriwal et al. | 709/236 |
| 6,751,259 | B2 | * 6/2004 | Zhang et al. | 375/240.26 |
| 6,948,186 | B1 | * 9/2005 | Brosey | 725/151 |
| 7,050,461 | B2 | 5/2006 | Abe et al. | |
| 7,058,751 | B2 | 6/2006 | Kawarai et al. | |
| 2001/0040925 | A1* | 11/2001 | Abelard et al. | 375/240.26 |
| 2002/0041626 | A1* | 4/2002 | Yoshioka et al. | 375/240 |
| 2002/0067744 | A1* | 6/2002 | Fujii et al. | 370/535 |
| 2003/0037154 | A1* | 2/2003 | Poggio et al. | 709/230 |
| 2003/0126188 | A1* | 7/2003 | Ta et al. | 709/108 |
| 2006/0067345 | A1* | 3/2006 | Hayashi et al. | 370/412 |
| 2007/0086454 | A1* | 4/2007 | Grinfeld | 370/389 |
| 2008/0215317 | A1* | 9/2008 | Fejzo | 704/217 |

FOREIGN PATENT DOCUMENTS

| | | | |
|---|---|---|---|
| EP | 0 969 631 A2 | | 1/2000 |
| EP | 1148729 A1 | * | 10/2001 |
| EP | 1641127 A1 | * | 3/2006 |
| JP | 2000-22724 | | 1/2000 |
| JP | 2001-016547 | | 1/2001 |
| JP | 2001-204032 | | 7/2001 |
| JP | 2002-208938 | | 7/2002 |
| JP | 2002-304821 | | 10/2002 |
| JP | 2003-032679 | | 1/2003 |
| WO | WO/9526595 | * | 10/1995 |
| WO | 00/21247 | | 4/2000 |

* cited by examiner

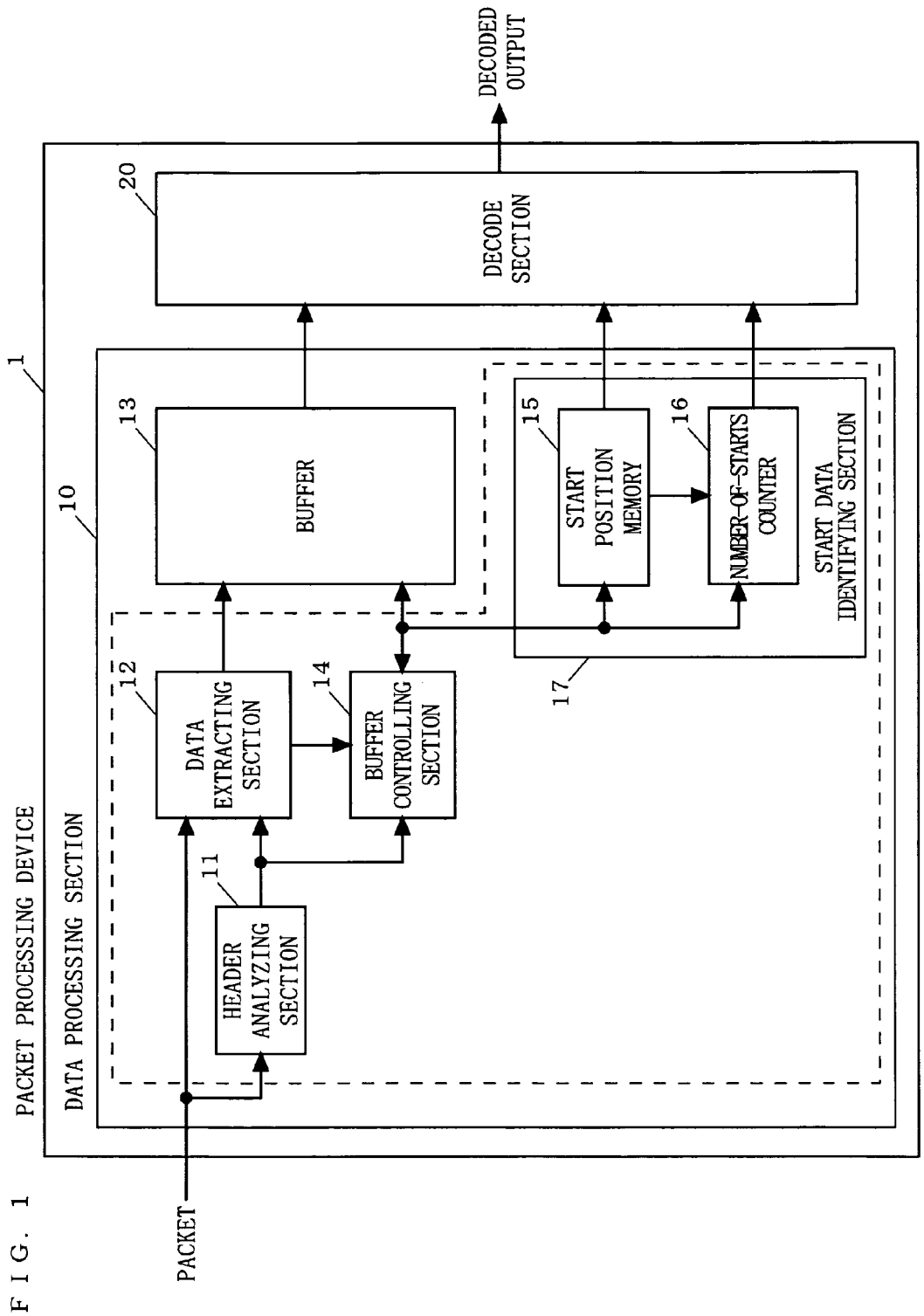
F I G. 1

PACKET PROCESSING DEVICE AND METHOD

TECHNICAL FIELD

The present invention relates to a device and method of packet processing. More particularly, the present invention relates to a packet processing device and a packet processing method for decoding compression-encoded image data, audio data, and the like from packets in which variable length data is split and stored.

BACKGROUND ART

In recent years, in digital broadcast and the like based on CS and BS, MPEG (Moving Picture Experts Group) technique is adopted as an encoding technique for compressing image data, audio data, and the like. Therefore, a reception device and a recording/reproduction device for digital broadcast and the like need to comprise a device which decodes a bit stream of data that is compression-encoded by MPEG technique.

Now, MPEG2 technique, which is mainly used in a digital broadcast, will be briefly described. In MPEG2 technique, a bit stream of compression-encoded image data, audio data, and the like is referred to as an elementary stream (ES). As a packet structure for carrying this elementary stream, PES (Packetized Elementary Stream) is defined. FIG. 15 is a diagram illustrating a detailed structure of a PES packet. Further, in MPEG2 technique, a PES packet is split into a predetermined unit, stored in a transport stream packet (hereafter, referred to as a "TS packet"), and broadcasted. FIG. 16 is a diagram illustrating a detailed structure of a TS packet. FIG. 17 is a diagram describing the relationship between TS packets and PES data.

For this reason, a device handling a bit stream under MPEG2 technique needs to perform a packet process, i.e., extracting PES data from a plurality of TS packets and decoding it. Hereinafter, this packet process will be described.

FIG. 18 is a block diagram illustrating an exemplary construction of a MPEG decoding device performing a conventional packet process. In FIG. 18, a conventional MPEG decoding device 101 comprises a TS header analyzing section 111, a PES extracting section 112, a PES buffer 113, a PES buffer controlling section 114, and a MPEG decode section 120. The TS header analyzing section 111, the PES extracting section 112, the PES buffer 113, and the PES buffer controlling section 114 together constitute a transport stream decoding section 110.

To the TS header analyzing section 111 and the PES extracting section 112, TS packets under MPEG2 technique are sequentially inputted. Every time when a TS packet is inputted, the TS header analyzing section 111 analyzes the TS header of the TS packet. By referring to the analysis result of the TS header from the TS header analyzing section 111, the PES extracting section 112 extracts necessary PES data from the inputted TS packet. Then, the PES extracting section 112 outputs the extracted PES data to the PES buffer 113. The PES buffer 113 temporarily stores the PES data extracted in the PES extracting section 112. The PES buffer controlling section 114 outputs a control signal to the PES buffer 113 and performs an address control, an accumulated data control, and the like for the PES buffer 113.

The MPEG decode section 120 reads out the PES data from the PES buffer 113 with an arbitrary timing, executes a decode process, and outputs a decoded image and decoded audio. At this time, in order to analyze the PES header necessary for the MPEG decode process, a start position of the PES data, namely, information defining the PES data including the PES header becomes necessary. Therefore, usually, by detecting a packet start code possessed by a PES header in the PES data stored in the PES buffer 113, the MPEG decode section 120 identifies a start position of the PES data. The technology relating to the identification of a start position in PES data is described, for example, in Japanese Laid-Open Patent Publication No. 2001-16547 (pages 6 to 8, FIG. 1).

DISCLOSURE OF THE INVENTION

However, in the case where the MPEG decode section 120 identifies a start position of PES data by detecting a packet start code in PES data extracted from TS packets, as in the aforementioned conventional MPEG decoding device 101, there are problems as follows.

Firstly, a PES is variable in length. Therefore, in order to identify a start position of PES data, it is necessary to perform a process of packet start code detection for all of the PES data stored in the PES buffer 113. Note that a PES packet length contained in a PES header may possibly take the value "0"; even in this case, the actual length of the PES packet is not "0", and therefore it is necessary to detect the packet start code in order to identify the start position. Further, within an adaptation field and the PES header, a pattern which is identical to the packet start code, so-called a pseudo start code, may occur. For this reason, in order to identify a correct start position of PES data while excluding a pseudo start code, a large amount of processing is necessary.

Thus, there have been problems in that the processing load in the MPEG decode section 120 becomes heavy, leading to a decrease in MPEG decode processing speed and an increase in electric power consumption associated with an operation for identifying a start position in PES data. These problems are not only limited to TS packets under MPEG2 technique, but also relate to all packet transmissions in which variable length data is split into packets of an equal size.

Thus, an object of the present invention is to provide a device and method of packet processing for, when decoding data of packets in which variable length data is split and stored, by generating information which identifies a start position of data and providing it to a decoder, realizing a reduction in processing load at the decoder, improvement in decode processing speed, and decrease in electric power consumption.

The present invention is directed to a packet processing device which processes packets in which variable length data is split and stored. In order to achieve the above-described object, the packet processing device of the present invention comprises a header analyzing section, a data extracting section, a buffer, a buffer controlling section, and a start data identifying section.

The header analyzing section analyzes a header of a packet being inputted, and determines whether data stored in the payload is start data containing start information or other data. The data extracting section refers to the analysis result from the header analyzing section, and extracts the data from the payload of the packet. The buffer stores the data extracted by the data extracting section. The buffer controlling section controls the stored position and the accumulated data amount of the data in the buffer. The start data identifying section generates information for identifying the start data in the buffer, based on the analysis result from the header analyzing section and the control by the buffer controlling section.

A typical start data identifying section is constituted with a start position memory which retains stored position information of start data stored in the buffer and a number-of-starts counter which counts the number of start data stored in the buffer. For the start position memory, a register which retains stored position information is conceivable. For stored position information, a write address of a buffer storing start data or information representing a position of start data relative to first data stored in a buffer is conceivable.

Moreover, the packet processing device of the present invention may further comprise a decode section which reads out data from the buffer with a predetermined timing, obtains stored position information and a count number from the start data identifying section, separates start data contained in the data read out based on the stored position information and the count number into start information and data, and performs a decode process for the data read out based on the start information.

Here, it is preferable that the buffer controlling section compares the accumulated data amount against a predetermined threshold amount, and, when the accumulated data amount becomes equal to or greater than the threshold amount, outputs a predetermined notification signal. When detecting this predetermined notification signal, it is preferable that the number-of-starts counter displays the number of start data contained in an amount of data corresponding to the threshold amount. In the case where a decode section is comprised, an amount of data corresponding to the threshold amount is caused to be read out from the buffer at a timing with which a notification signal is received.

Alternatively, it is preferable that the buffer controlling section compares the number in the number-of-starts counter against a predetermined threshold number, and, when the number becomes equal to or greater than the threshold number, outputs a predetermined notification signal. The threshold number should only be the number of areas in a start position memory which enables retention of stored position information. In the case where a decode section is comprised, data is caused to be read out from the buffer with the timing of receiving a notification signal.

Specifically, a transport stream packet under MPEG technique that stores variable-length PBS data, is inputted. In this case, the header analyzing section analyzes the header of the TS packet in the transport stream being inputted, and determines whether data stored in the payload is start PBS data containing a PBS header or other PBS data; the data extracting section refers to the analysis result from the header analyzing section, and extracts PBS data from the payload of the TS packet; the buffer stores the PBS data extracted by the data extracting section; the buffer controlling section controls the stored position and the accumulated data amount of the PBS data in the buffer; and the start data identifying section generates information for identifying the start PBS data in the buffer, based on the analysis result from the header analyzing section and the control by the buffer controlling section.

Each process which is conducted by each constituent of the aforementioned packet processing device can be taken as a packet processing method and a decode processing method which define a series of processing procedures. In other words, it is a packet processing method for analyzing a header of a packet being inputted, determining whether data stored in the payload is start data containing start information or other data, referring to the analysis result to extract the data from the payload of the packet, storing the data extracted to the buffer, controlling the stored position of the data and the accumulated data amount in the buffer, and generating information for identifying the start data in the buffer based on the analysis result and the control. Alternatively, it is a decode processing method for reading out data from the buffer with a predetermined timing, separating start data contained in the data read out into start information and data based on information for identifying start data, and performing a decode process for the data read out based on the start information.

Functional blocks constituting the aforementioned packet processing device can be realized as an LSI, which is an integrated circuit. Further, the packet processing method is provided in the form of a program for a computer to execute a series of processing steps. This program may be introduced into a computer in the form of being recorded in a recording medium readable by the computer.

As described above, according to the present invention, when data stored in a buffer is read out for decoding, information for identifying start data can be obtained. Therefore, there is no need for detecting a start position at a decoding side, and a reduction in decode processing load, improvement in decode processing speed, and decrease in electric power consumption can be realized. Moreover, by ensuring that the decoding side performs a data read process only when a notification signal that the accumulated data amount in the buffer has reached a threshold amount is received, the decode process can be lightened. Furthermore, by ensuring that the decoding side reads out the data automatically when a predetermined number of start data has been stored to the buffer, the circuit scale of the start position memory can be prevented from increasing even in the case where there is a possibility that a large number of start data may be stored in the buffer due to, for example, data of short length being successively inputted.

BRIEF DESCRIPTION OF THE DRAWINGS

FIG. 1 is a block diagram illustrating a construction of a packet processing device 1 according to an embodiment of the present invention.

BEST MODE FOR CARRYING OUT THE INVENTION

Figure 2:
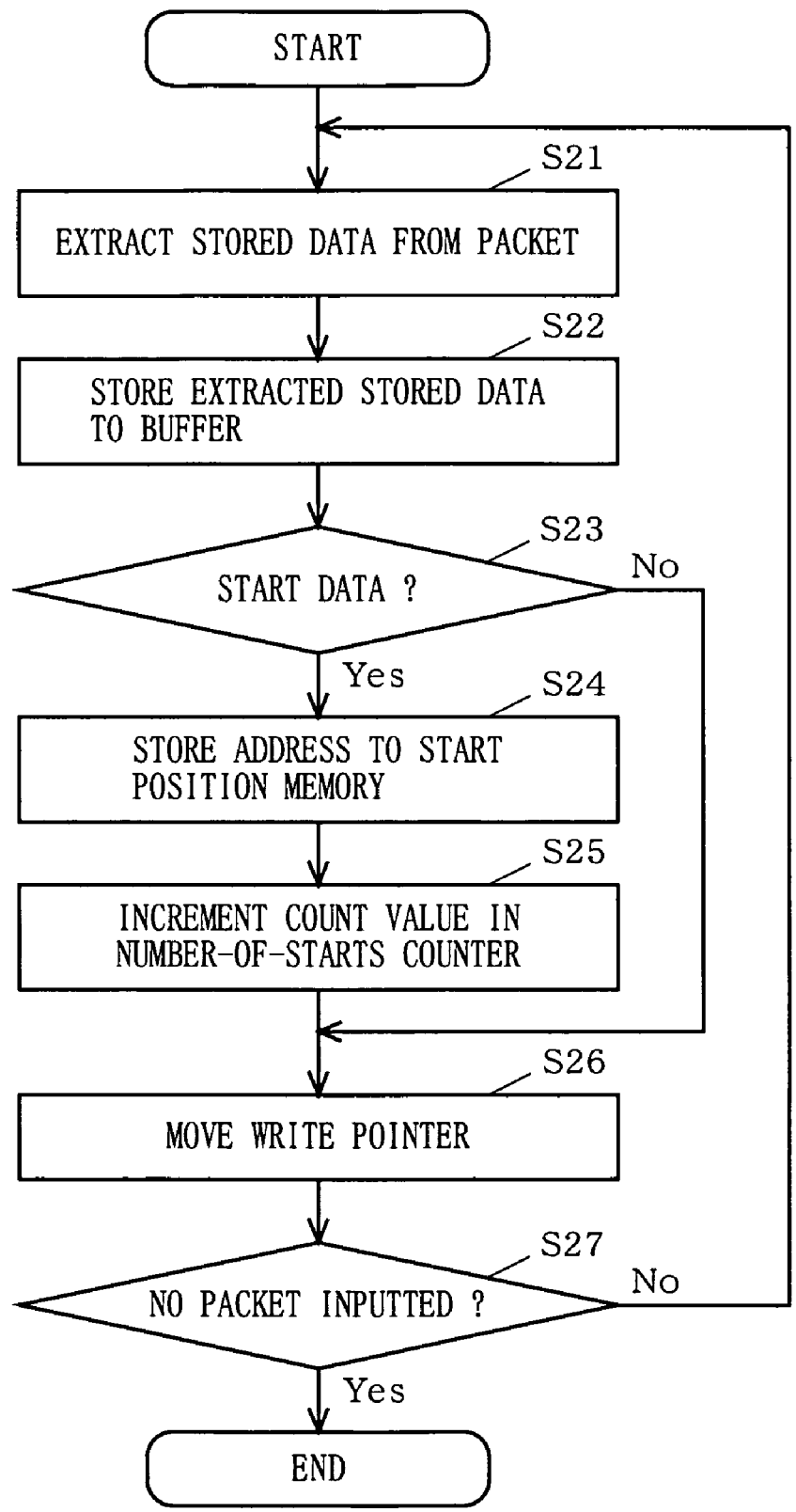
FIG. 2 is a flowchart illustrating an exemplary basic data processing procedure which a data processing section 10 performs.

Hereinafter, with respect to an exemplary case where packets in which variable length data is split and stored is inputted as an example, a packet processing device of the present invention will be described.

FIG. 1 is a block diagram illustrating the construction of a packet processing device 1 according to an embodiment of the present invention. In FIG. 1, the packet processing device 1 comprises a header analyzing section 11, a data extracting section 12, a buffer 13, a buffer controlling section 14, a start data identifying section 17, and a decode section 20. The header analyzing section 11, the data extracting section 12, the buffer 13, the buffer controlling section 14, and the start data identifying section 17 constitute a data processing section 10. A typical start data identifying section 17 is composed of a start position memory 15 and a number-of-starts counter 16. Note that the present embodiment illustrates the construction where the decode section 20 is being incorporated into the packet processing device 1; however, this decode section 20 may be constructed independently of the packet processing device 1.

To the header analyzing section 11 and the data extracting section 12, packets in which variable length data is split and stored are sequentially inputted. Every time when a packet is inputted, the header analyzing section 11 analyzes the header of the packet and determines whether the data stored in the payload is start data containing start information or other data (non-start data). Here, the start information is header information and the like in which time information and the like necessary for a decode process are written. The data extracting section 12 refers to the analysis result of the header from the header analyzing section 11, and extracts necessary data from the payload of the packet inputted. Then, the data extracting section 12 outputs the extracted data to the buffer 13 and, if start data has been outputted, notifies so to the buffer controlling section 14. The buffer 13 stores the data outputted from the data extracting section 12 in a predetermined position, in accordance with the stored position control by the buffer controlling section 14.

The buffer controlling section 14 performs the stored position control and the accumulated data control for the buffer 13. This stored position control means the controlling of a position (write address) at which to write the data extracted by the data extracting section 12, and is typically performed by employing a write pointer (WP). The accumulated data control means performs a control so that the data extracted by the data extracting section 12 is stored to the buffer 13 without overflowing, and is typically the management of the accumulated data amount of data stored in the buffer 13. Further, when being notified from the data extracting section 12 that start data has been stored in the buffer 13, the buffer controlling section 14 notifies the start position memory 15 of the stored position information, and notifies the number-of-starts counter 16 of the storing.

The start position memory 15 retains the write address of the start data on the buffer 13 which is notified by the buffer controlling section 14, as the stored position information of the start data. This start position memory 15 is a register having a plurality of register areas therein, a memory having a plurality of storage areas therein, or the like. If it is a memory, the number to be stored can be easily changed. Note that the memory is to be constructed independently of the buffer 13. The number-of-starts counter 16 counts the number of start data having been written in the buffer 13. Specifically, when start data is stored in the buffer 13, i.e., when being notified from the buffer controlling section 14, the count number in the number-of-starts counter 16 is incremented. Note that this count number in the number-of-starts counter 16 is reset when the start data corresponding to the count number has been read out from the buffer 13 by the decode section 20, i.e., when the start position memory 15 is referred to.

Next, with reference to FIG. 2, the process performed by the data processing section 10 will be described in detail. FIG. 2 is a flowchart illustrating an exemplary basic data processing procedure performed by the data processing section 10.

The data extracted by the data extracting section 12 is stored at an address position in the buffer 13 as designated by the write pointer (step S21, S22). If the stored data is not start data (step S23, No), the write pointer in the buffer 13 is moved to the next address position by the buffer controlling section 14 (step S26). On the other hand, if the data stored is start data (step S23, Yes), the address of the position at which the start data is stored is saved to the start position memory 15 by the buffer controlling section 14 (step S24). Further, the count number in the number-of-starts counter 16 is incremented by the buffer controlling section 14 (step S25). Thereafter, the write pointer in the buffer 13 is moved to the next address position by the buffer controlling section 14 (step S26).

The processes above are executed with respect to each packet inputted (step S27). Thus, the data processing section 10 causes the start position memory 15 and the number-of-starts counter 16 to store the stored position information of the start data written in the buffer 13 and the number thereof, respectively.

Figure 3:
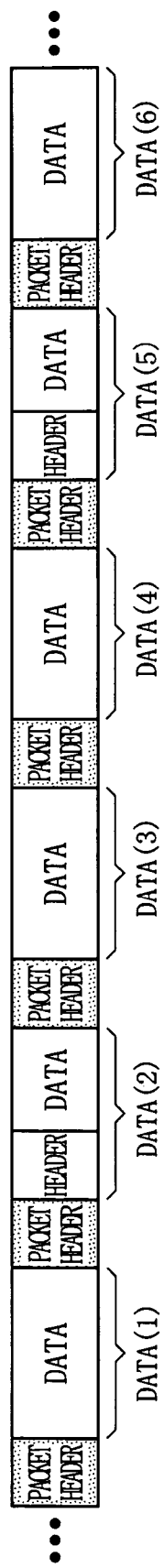
FIG. 3 is a diagram illustrating exemplary packets which are inputted to the packet processing device 1.
Figure 4A:
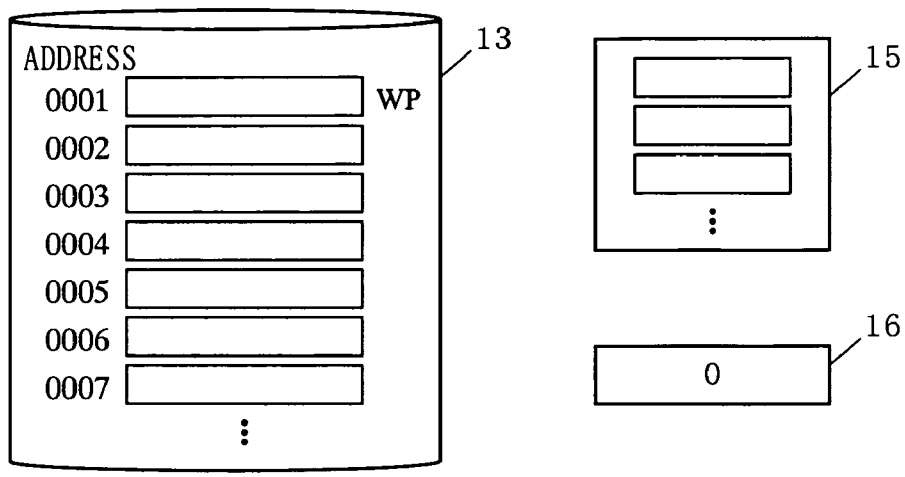
FIG. 4A to FIG. 4F are diagrams describing states of a buffer 13, a start position memory 15, and a number-of-starts counter 16, in accordance with the packet in FIG. 3.
Figure 4B:
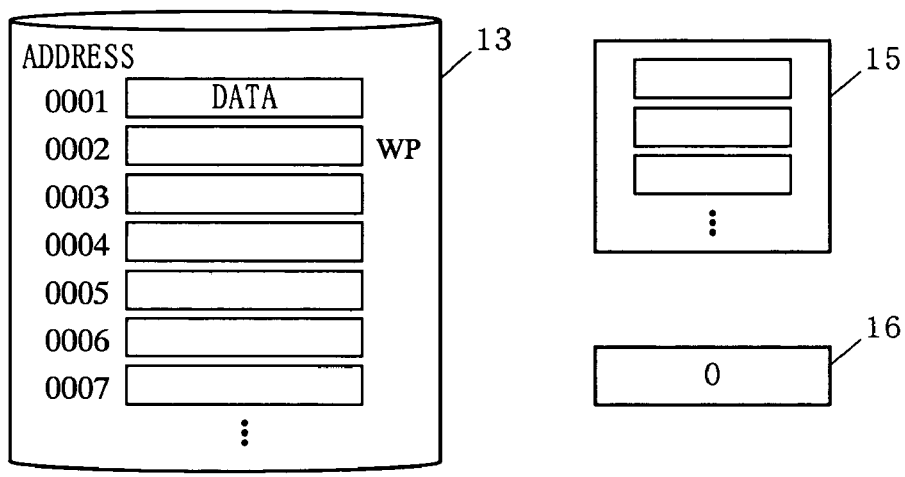
Figure 4C:
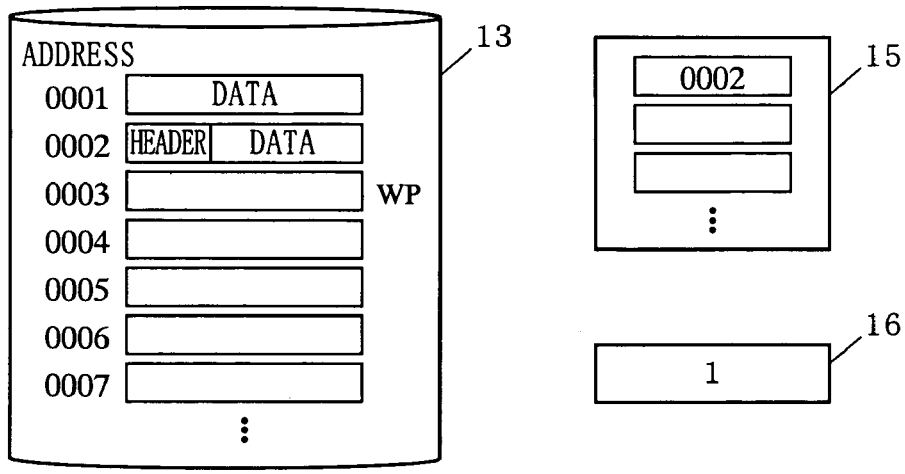
Figure 4D:
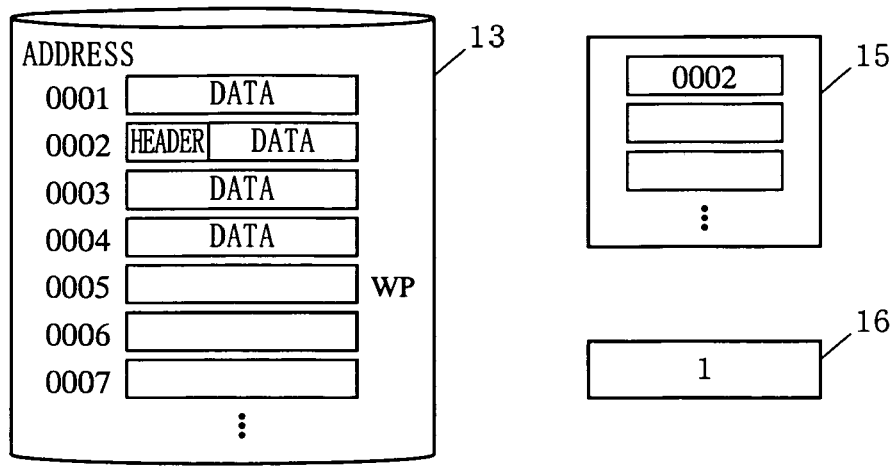
Figure 4E:
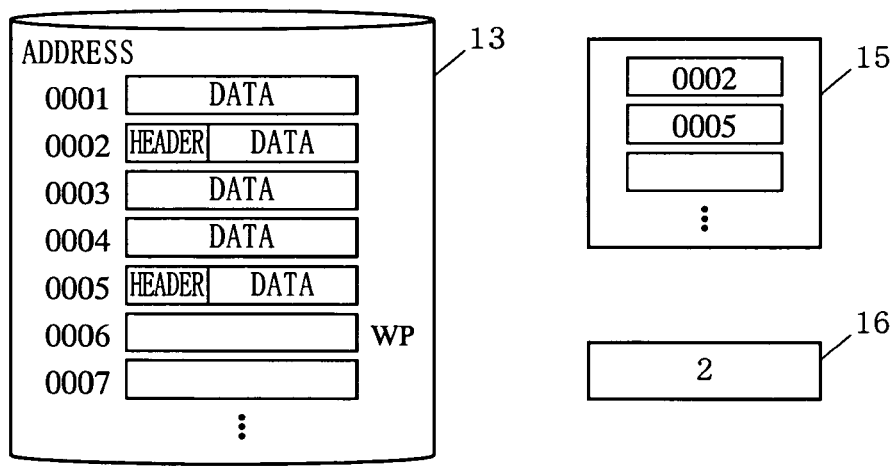

Next, with reference to FIG. 3 and FIG. 4A to FIG. 4F, the relationship between the data stored in the buffer 13, the stored position information retained in the start position memory 15, and the count number in the number-of-starts counter 16 will be specifically described. FIG. 3 is a diagram illustrating exemplary packets which are inputted to the packet processing device 1. FIG. 4A to FIG. 4F are diagrams describing states of the buffer 13, the start position memory 15, and the number-of-starts counter 16, in accordance with the packet in FIG. 3. Here, a case will be described where the packets shown in FIG. 3 are inputted when the states of the buffer 13, the start position memory 15, and the number-of-starts counter 16 are as shown in FIG. 4A.

Data (1), which is extracted first, is stored to the address "0001", as designated by the write pointer in the buffer 13. Because data (1) is not start data, only a moving of the write pointer to the address "0002" is conducted (the state in FIG. 4B).

Data (2), which is next extracted, is stored in the address "0002", as designated by the write pointer in the buffer 13. Because data (2) is start data, the address "0002" is retained in the start position memory 15, and the count number in the number-of-starts counter 16 is updated from "0" to "1". Thereafter, the write pointer moves to the position of the address "0003" (the state in FIG. 4C).

Likewise, next-extracted data (3) and data (4), which are not start data, are stored in the addresses "0003" and "0004", respectively, according to the write pointer in the buffer 13. The write pointer is moved to the position of the address "0005", through this process (the state in FIG. 4D).

Furthermore, next-extracted data (5), which is start data, is stored in the address "0005", as designated by the write pointer in the buffer 13. Then, the address "0005" is additionally retained in the start position memory 15, and the count number in the number-of-starts counter 16 is updated from "1" to "2". Thereafter, the write pointer moves to the position of the address "0006" (the state in FIG. 4E).

Next-extracted data (6), which is not start data, is stored in the address "0006", according to the write pointer in the buffer 13. The write pointer moves to the position of the address "0007" (the state in FIG. 4F).

Next, the operation that the decode section 20 performs will be described. With a predetermined timing, the decode section 20 refers to the start position memory 15 and the number-of-starts counter 16, and reads out the data from the buffer 13. Then, the decode section 20 performs a decode process for the data read out, and outputs images and audio. In the decode section 20, the following six techniques are conceivable for the data read process to be performed.

Figure 5A:
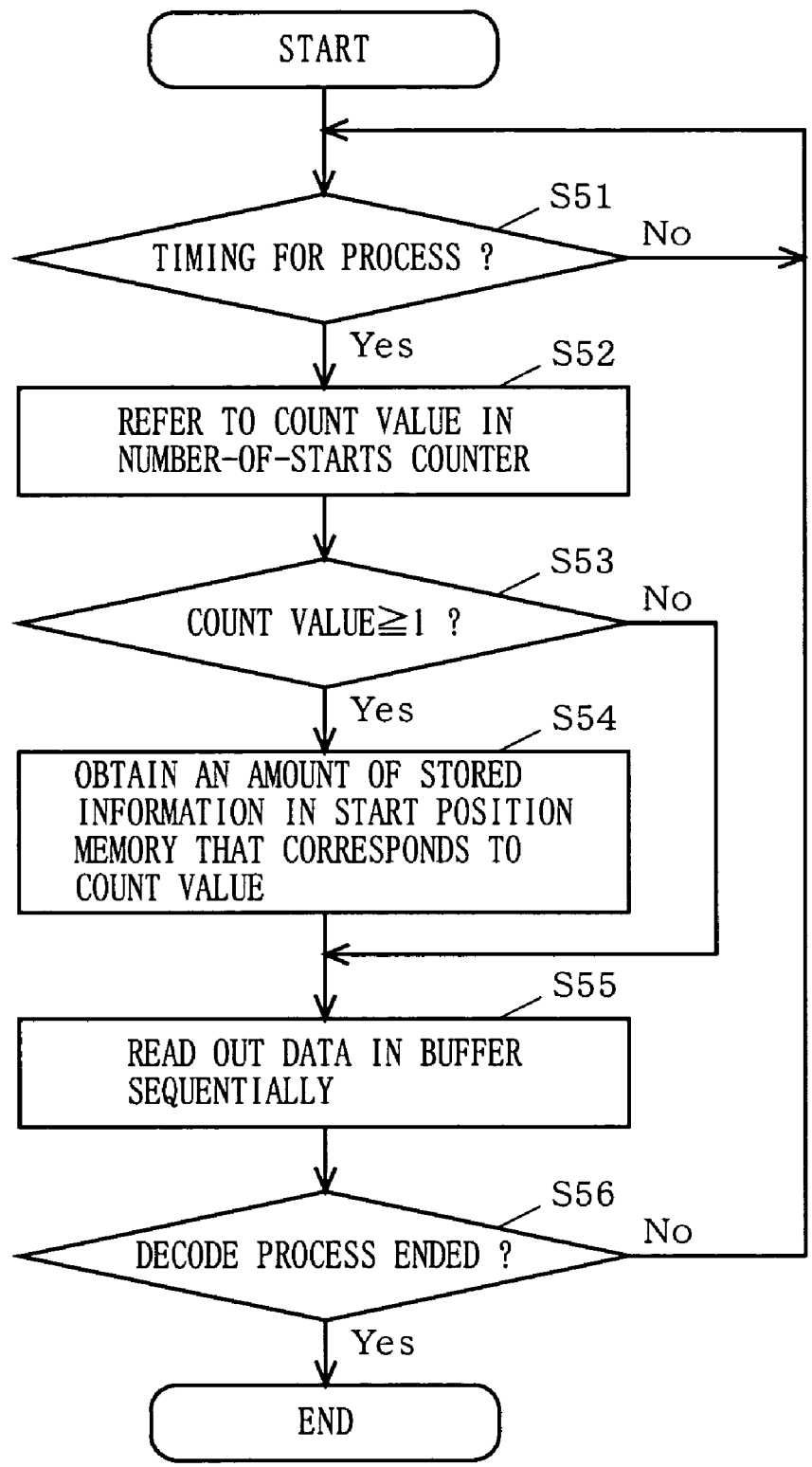
FIG. 5A is a flowchart illustrating an exemplary read processing procedure for data which a decode section 20 performs (first technique).
Figure 5B:
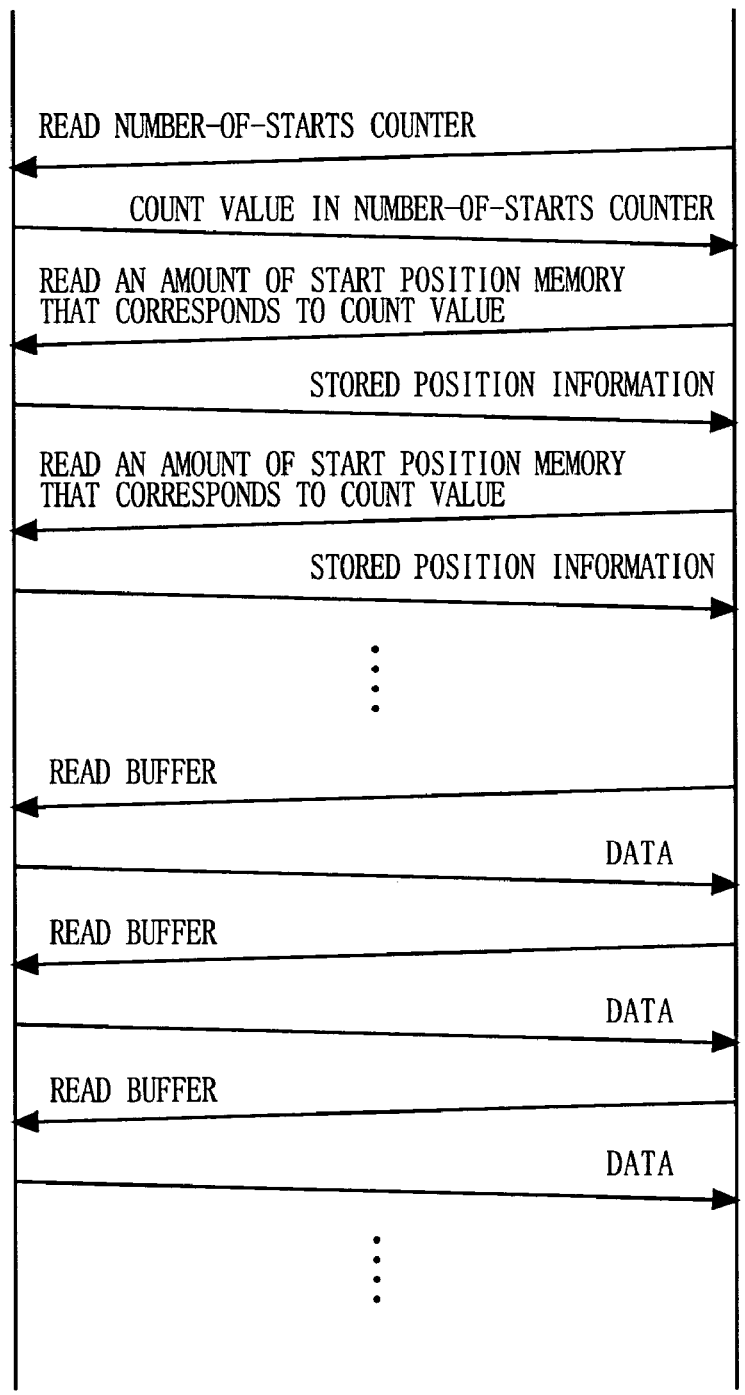
FIG. 5B is a diagram illustrating an exemplary processing sequence according to the procedure in FIG. 5A.

1. First Technique (FIG. 5A, FIG. 5B)

The first technique is a technique in which the decode section 20 executes a decode process with an arbitrary timing. First, when the timing for the process comes, the decode section 20 refers to the count number in the number-of-starts counter 16 (step S51, S52). Next, the decode section 20 determines whether the count number is equal to or greater than "1" or not (step S53). If the count number is equal to or greater than "1", the decode section 20 obtains a number, equal to the count number, of addresses that are stored in the start position memory 15 (step S54).

Figure 4F:
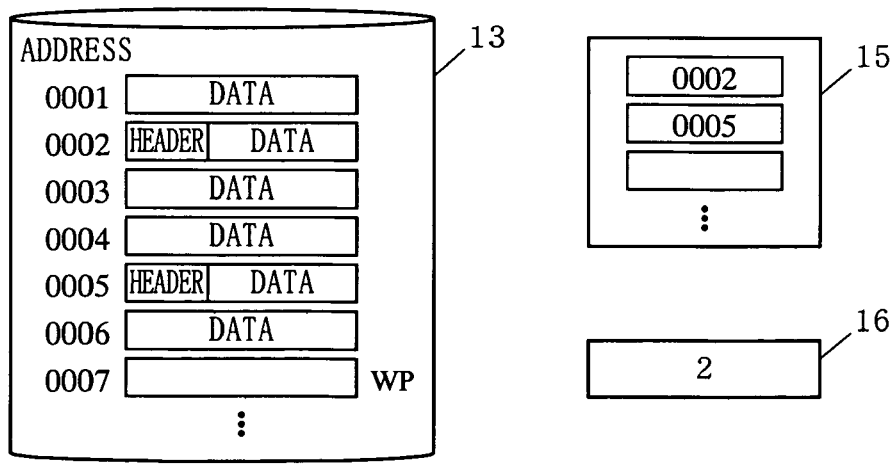

For example, in the case where a decode process is executed in the state of FIG. 4F, the decode section 20 refers to the count number "2" in the number-of-starts counter 16. Then, the decode section 20 obtains the two addresses prior to the latest information, i.e., "0002" and "0005", from the start position memory 15.

Next, the decode section 20 sequentially reads out the data stored in the buffer 13 from, for example, an address position designated by a read pointer (step S55). As for the start data which is read out from the address position that corresponds to the stored position information obtained from the start position memory 15, the decode section 20 separates it into a header and data, and performs a decode process of the data based on the header. This process can be performed by utilizing various time information which is contained in the header and necessary for the decode process.

Through repeatedly performing the above procedures until the decode process ends (step S56), the decode section 20 can perform the decode process of the data read out from the buffer 13, without newly performing a start position detection of the data. Note that FIG. 5B is a diagram illustrating an exemplary processing sequence according to the procedure in FIG. 5A.

Figure 6A:
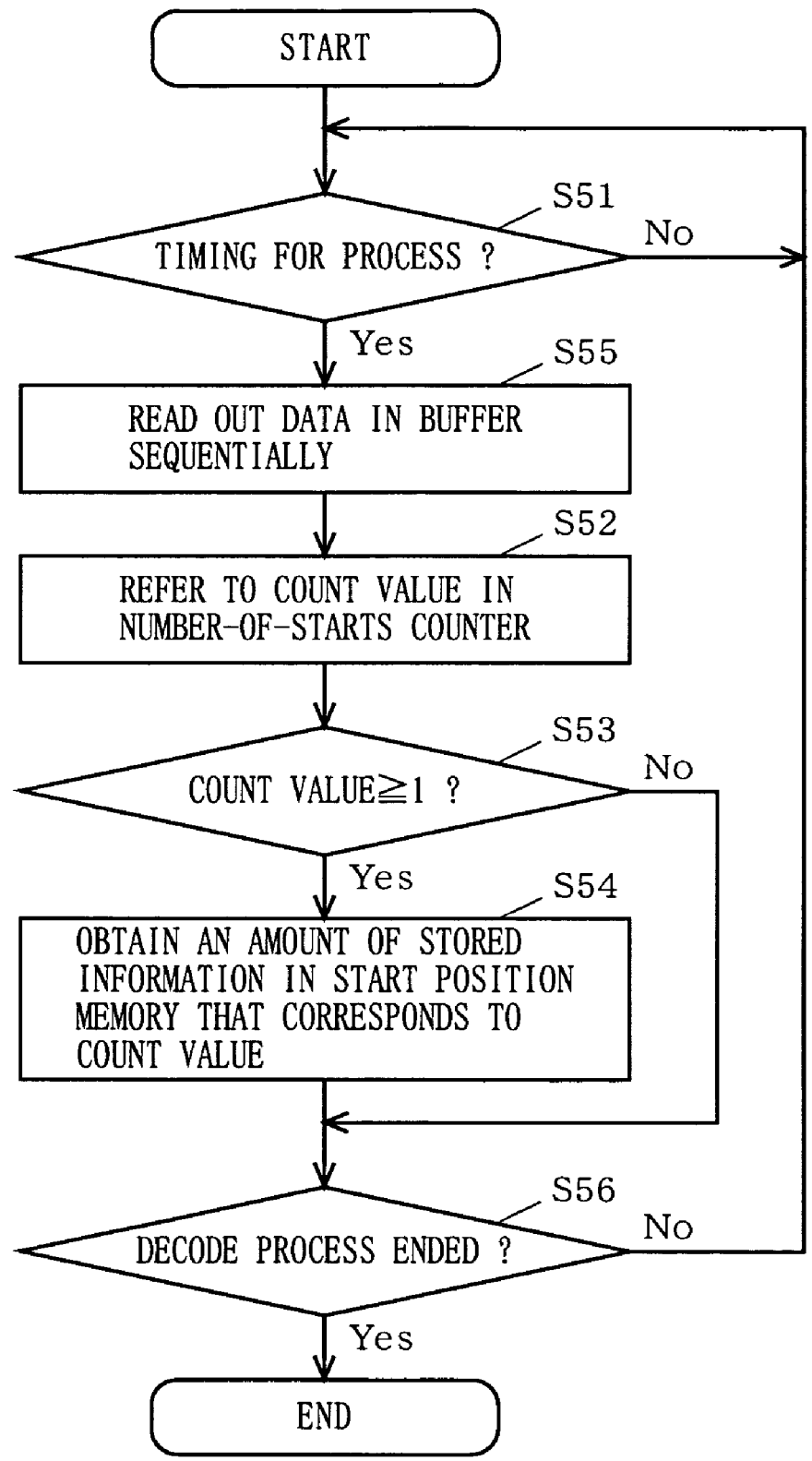
FIG. 6A is a flowchart illustrating an exemplary procedure for data read processing which the decode section 20 performs (second technique).
Figure 6B:
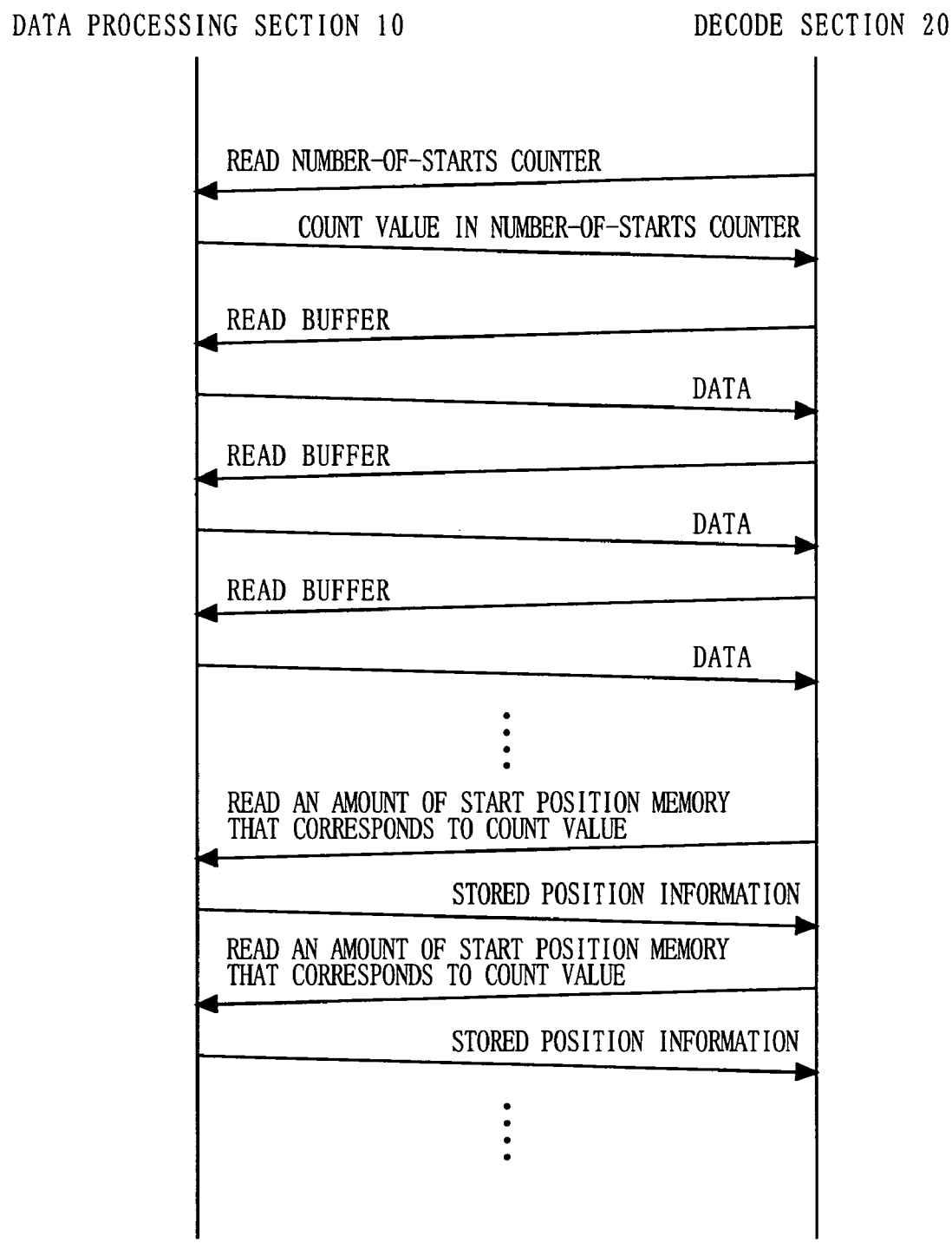
FIG. 6B is a diagram illustrating an exemplary processing sequence according to the procedure in FIG. 6A.

2. Second Technique (FIG. 6A, FIG. 6B)

The second technique is a variation of the first technique with respect to its procedure. In the second technique, when the timing for a process comes, first, the decode section 20 sequentially reads out the data stored in the buffer 13 from, for example, the address position designated by the read pointer (step S51, S55). Then, when the reading out of the data is completed, reference to the count number in the number-of-starts counter 16, determination, and obtainment of the address stored in the start position memory 15 are performed (step S52 to S54).

Through repeatedly performing the above procedures until the decode process ends (step S56), the decode section 20 can perform the decode process of the data read out from the buffer 13, without newly performing a start position detection of the data. Note that FIG. 6B is a diagram illustrating an exemplary processing sequence according to the procedure in FIG. 6A.

Figure 7A:
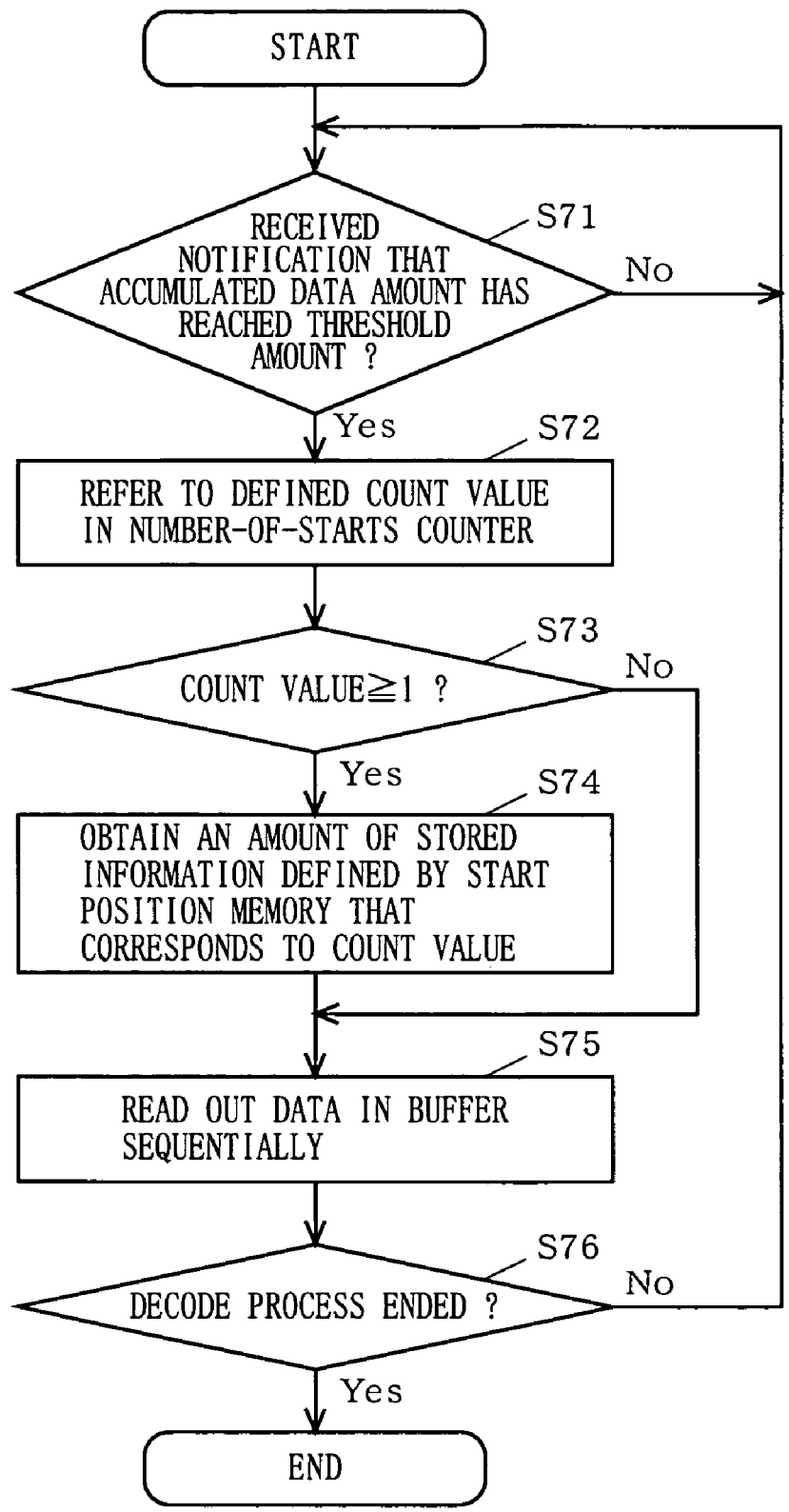
FIG. 7A is a flowchart illustrating an exemplary procedure for data read processing which the decode section 20 performs (third technique).
Figure 7B:
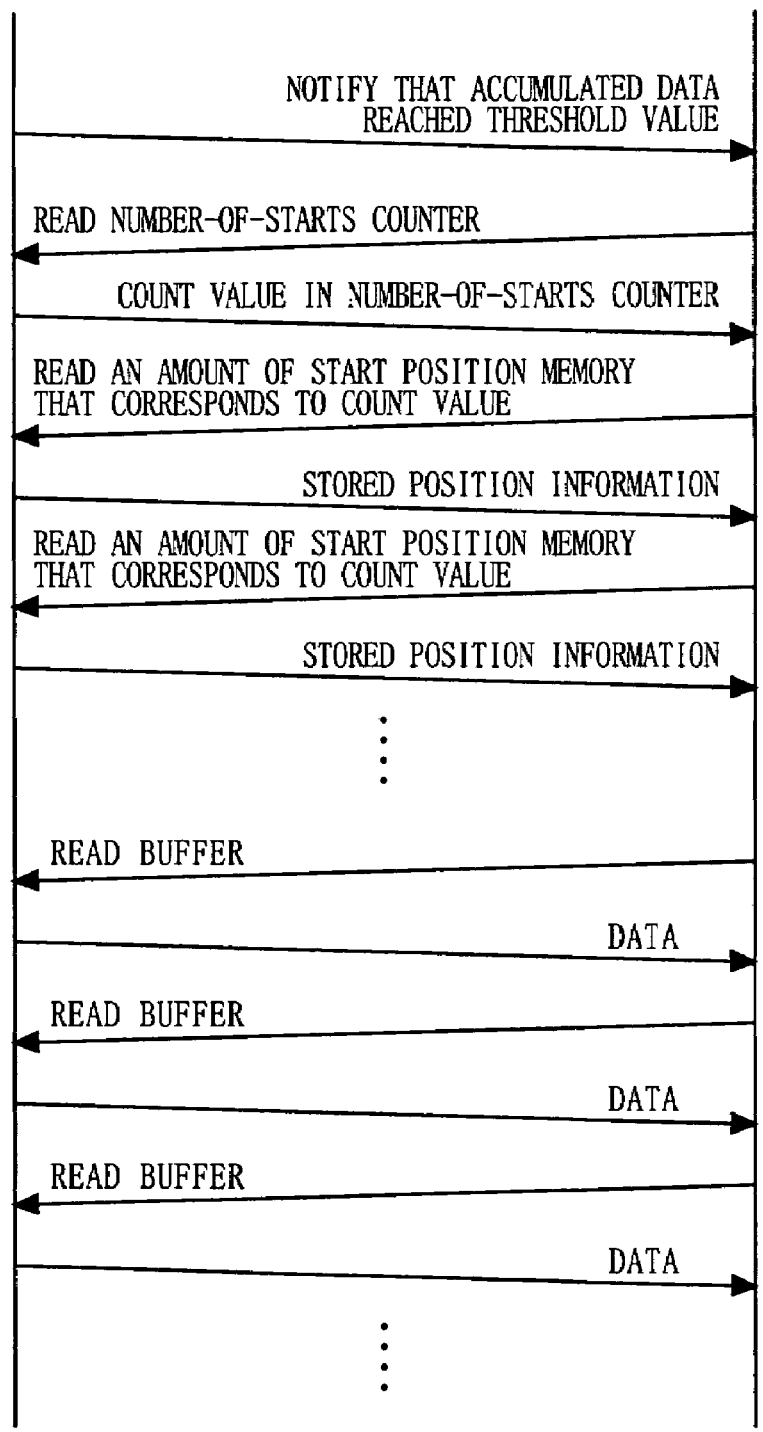
FIG. 7B is a diagram illustrating an exemplary processing sequence according to the procedure in FIG. 7A.

3. Third Technique (FIGS. 7A, 7B)

The third technique is a technique in which the decode section 20 executes a decode process according to a notification signal from the data processing section 10. In this technique, a predetermined threshold amount for the accumulated data amount in the buffer 13 is previously retained in the buffer controlling section 14. The threshold amount is set to a value equal to or less than the maximum accumulated data amount in the buffer 13 (for example, 80% of the maximum accumulated data amount). Then, the buffer controlling section 14 is caused to monitor the buffer 13 at all times and, when it is determined that the accumulated data amount has reached the threshold amount, output a notification signal to the start position memory 15 and to the number-of-starts counter 16. When receiving the notification signal, the start position memory 15 defines the addresses retained by that point of time as the stored position information to be provided to the decode section 20. Further, when receiving the notification signal, the number-of-starts counter 16 defines the count number by that point of time, namely, the number of the start data contained in an amount of data corresponding to the threshold amount, as the number information to be provided to the decode section 20. Furthermore, this notification signal is outputted to the decode section 20, through the start position memory 15 or the number-of-starts counter 16.

First, when receiving a notification signal that the accumulated data amount has reached the threshold amount, the decode section 20 refers to the count number defined by the number-of-starts counter 16 (step S71, S72). Next, the decode section 20 determines whether the count number is equal to or greater than "1" or not (step S73). If the count number is equal to or greater than "1", the decode section 20 obtains an amount of the stored position information defined by the start position memory 15 that corresponds to the count number (step S74). Thus, as for the start data which is stored in the buffer 13 after the aforementioned notification signal, no information will be provided to the decode section 20. Then, the decode section 20 sequentially reads out the data stored in the buffer 13 from, for example, an address position designated by the read pointer (step S75). As for the start data which is read out from the address position that corresponds to the stored position information obtained from the start position memory 15, the decode section 20 separates it into a header and data, and performs a decode process of the data based on the header.

Note that, when the decode section 20 has read out the stored position information in the start position memory 15, the number-of-starts counter 16 resets the count number having been defined, and displays the count of the number of start data stored in the buffer 13 at that point of time.

Through repeatedly performing the procedures above until the decode process ends (step S76), the decode section 20 can perform the decode process of the data read out from the buffer 13, without newly performing a start position detection of the data. Moreover, the decode section 20 only needs to perform the data read process when receiving a notification signal that the accumulated data amount in the buffer 13 has reached the threshold amount; thus, the decode process can be lightened. Note that FIG. 7B is an exemplary processing sequence according to the procedure in FIG. 7A.

Figure 8A:
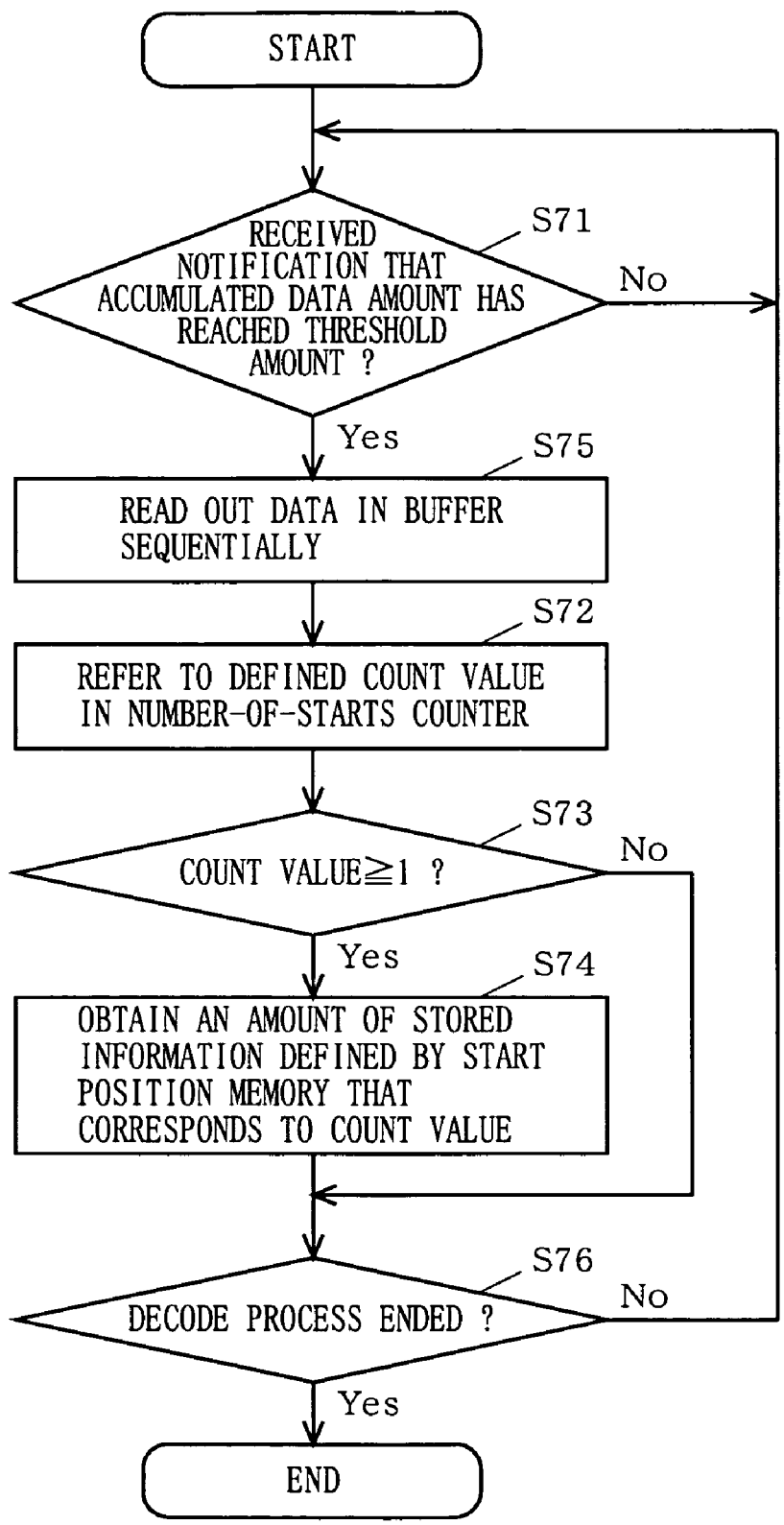
FIG. 8A is a flowchart illustrating an exemplary procedure for data read processing which the decode section 20 performs (fourth technique).
Figure 8B:
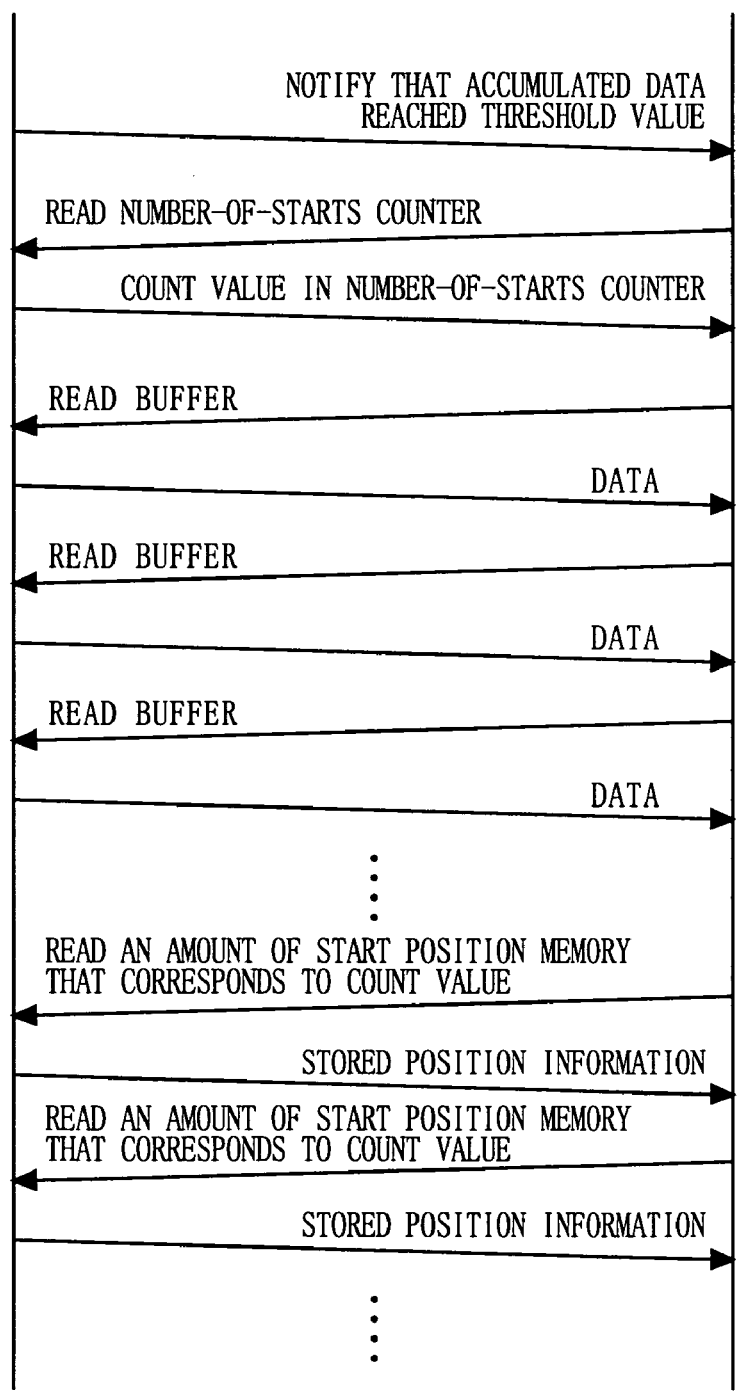
FIG. 8B is a diagram illustrating an exemplary processing sequence according to the procedure in FIG. 8A.

4. Fourth Technique (FIG. 8A, FIG. 8B)

The fourth technique is a variation of the third technique with respect to its procedure. In the fourth technique, when the timing for a process comes, first, the decode section 20 sequentially reads out the data stored in the buffer 13 from, for example, an address position designated by the read pointer (step S71, S75). Then, when the reading out of the data is completed, reference to the count number in the number-of-starts counter 16, determination, and obtainment of the address stored in the start position memory 15 are performed (step S72 to S74).

Through repeatedly performing the above procedures until the decode process ends (step S76), the decode section 20 can perform the decode process of the data read out from the buffer 13, without newly performing a start position detection of the data. Note that FIG. 8B is a diagram illustrating an exemplary processing sequence according to the procedure in FIG. 8A.

Figure 9A:
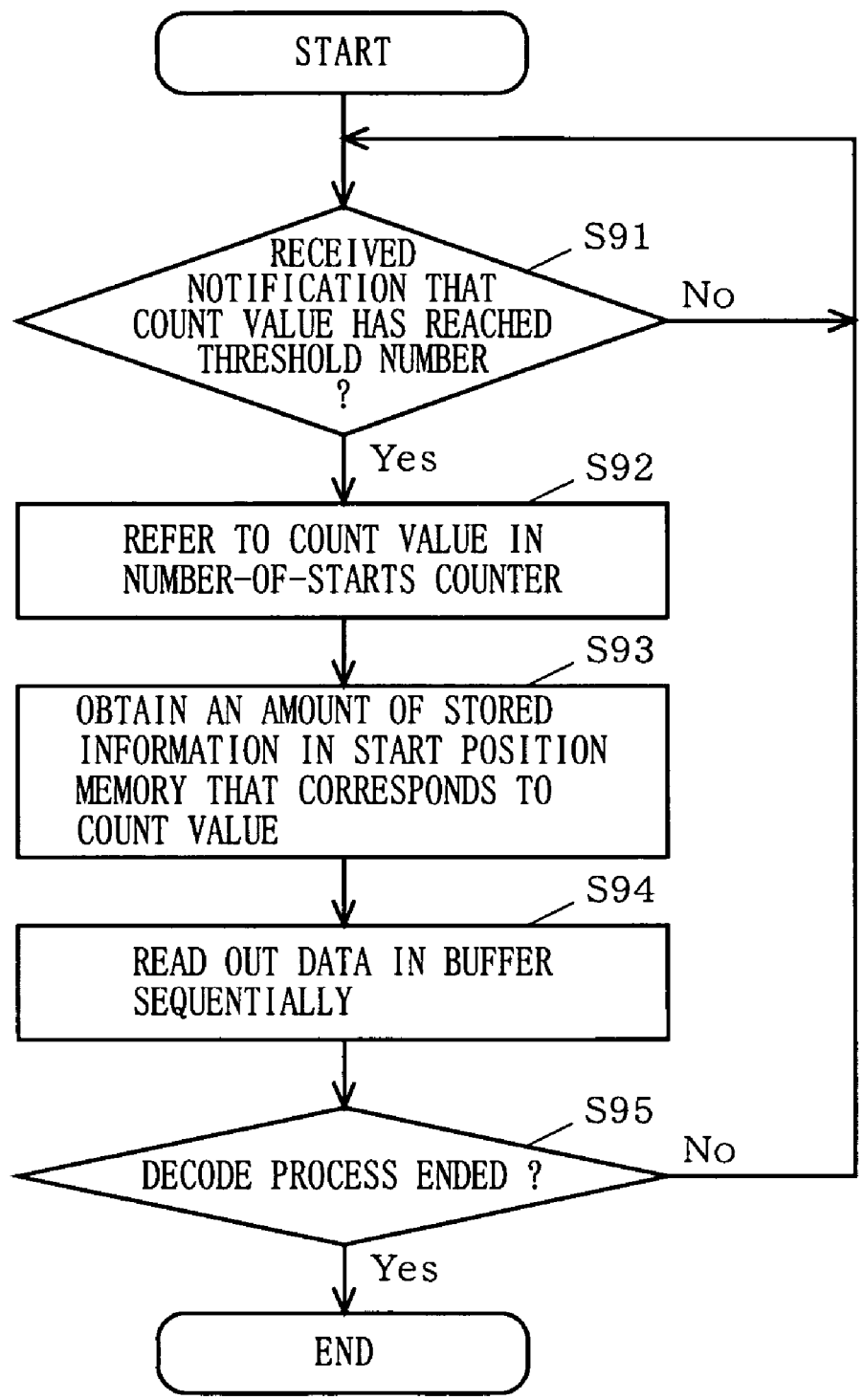
FIG. 9A is a flowchart illustrating an exemplary procedure for data read processing which the decode section 20 performs (fifth technique).
Figure 9B:
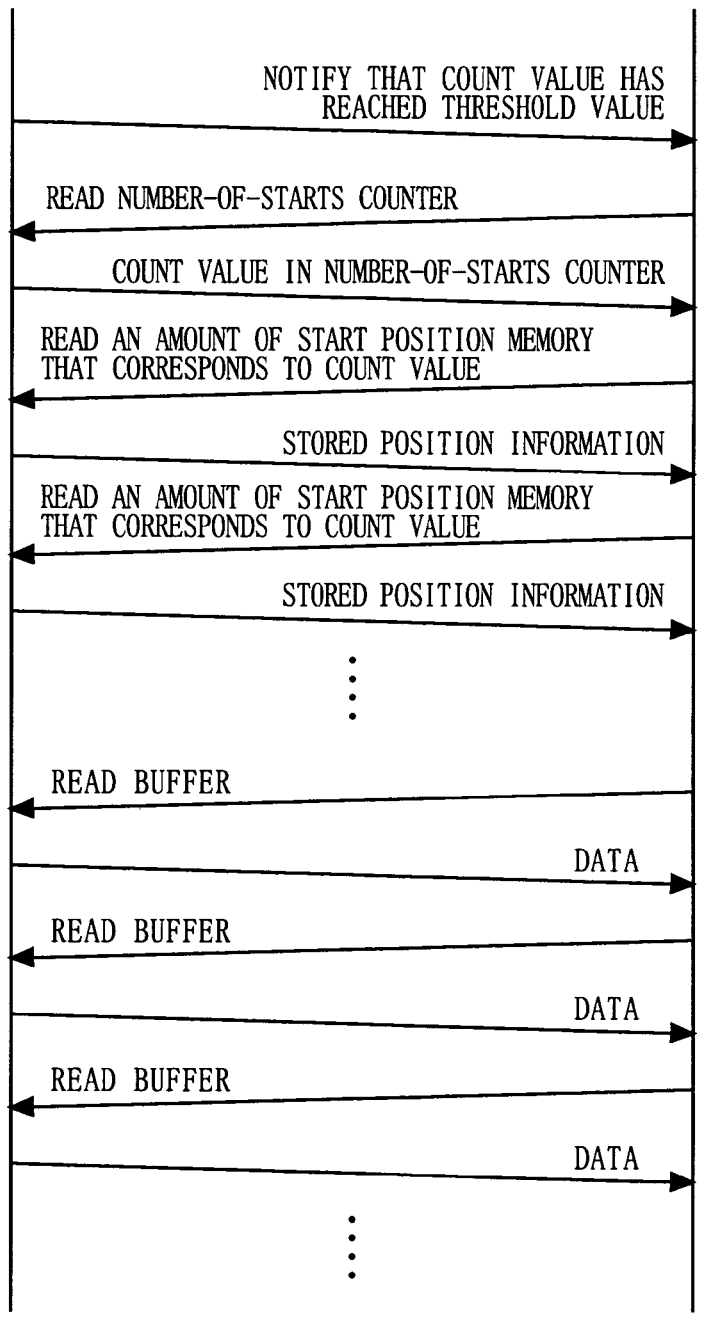
FIG. 9B is a diagram illustrating an exemplary processing sequence according to the procedure in FIG. 9A.

5. Fifth Technique (FIG. 9A, FIG. 9B)

The fifth technique is also a technique in which the decode section 20 executes a decode process according to a notification signal from the data processing section 10. In this technique, a predetermined threshold number that corresponds to the number of stored position information retainable in the start position memory 15 is previously retained in the number-of-starts counter 16. In other words, this threshold number is set according to the number of the storing areas that the start position memory 15 comprises. Then, when the number-of-starts counter 16 determines that the count number has reached the threshold number, the decode section 20 is so notified.

First, when receiving the notification signal that the count number has reached the threshold number, the decode section 20 refers to the count number in the number-of-starts counter 16 (step S91, S92). Next, the decode section 20 obtains an amount of the stored position information stored in the start position memory 15 that corresponds to the count number (step S93). Then, the decode section 20 sequentially reads out the data stored in the buffer 13 from, for example, an address position designated by the read pointer (step S94). As for the start data which is read out from the address position that corresponds to the stored position information obtained from the start position memory 15, the decode section 20 separates it into a header and data, and performs a decode process of the data based on the header.

Through repeatedly performing the procedures above until the decode process ends (step S95), the decode section 20 can perform the decode process of the data read out from the buffer 13, without newly performing a start position detection of the data. Moreover, because the decode section 20 reads out the data automatically when a predetermined number of start data has been stored in the buffer 13, the circuit scale of the start position memory 15 can be prevented form increasing even in the case where there is a possibility that a number of start data may be stored in the buffer 13 due to, for example, data of short length being successively inputted. Note that FIG. 9B is a diagram illustrating an exemplary processing sequence according to FIG. 9A.

Figure 10A:
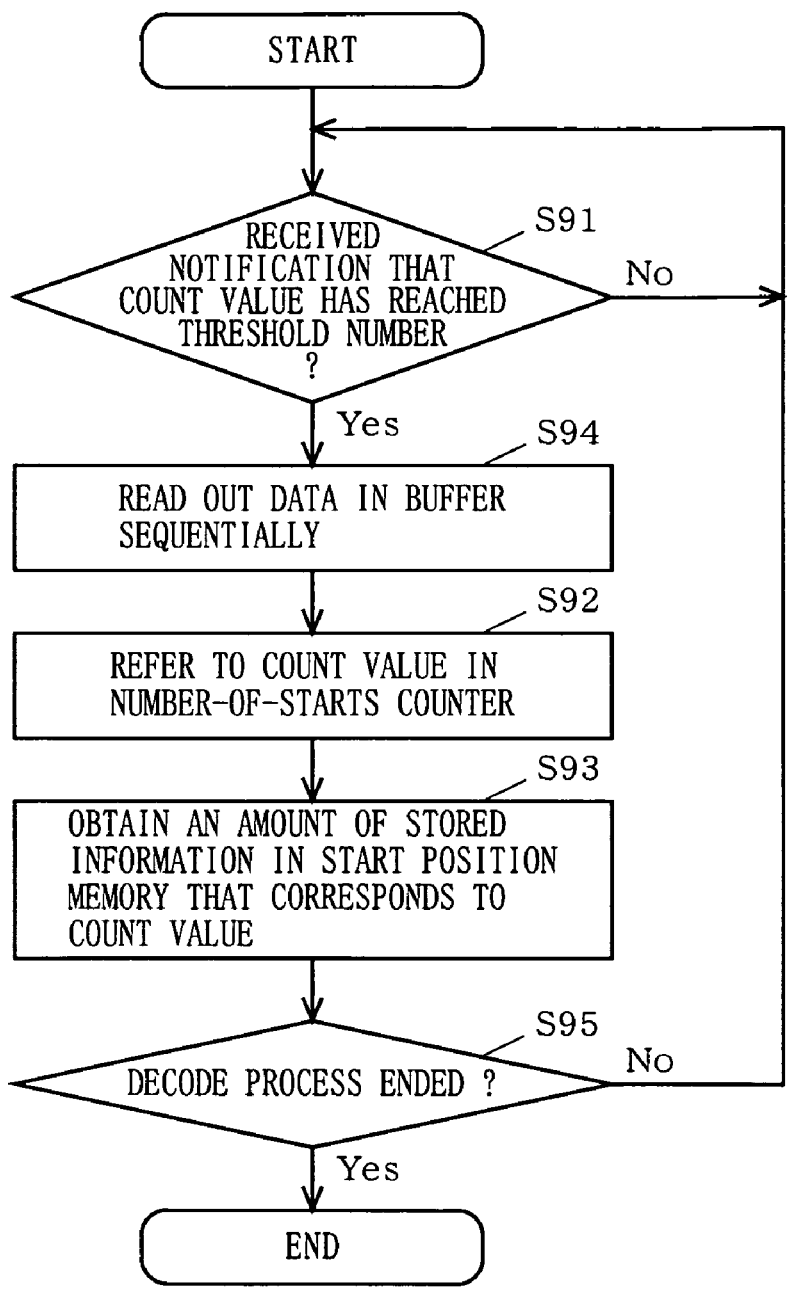
FIG. 10 is a flowchart illustrating an exemplary procedure for data read processing which the decode section 20 performs (sixth technique).
FIG. 10B is a diagram illustrating an exemplary processing sequence according to the procedure in FIG. 10A.
Figure 10B:
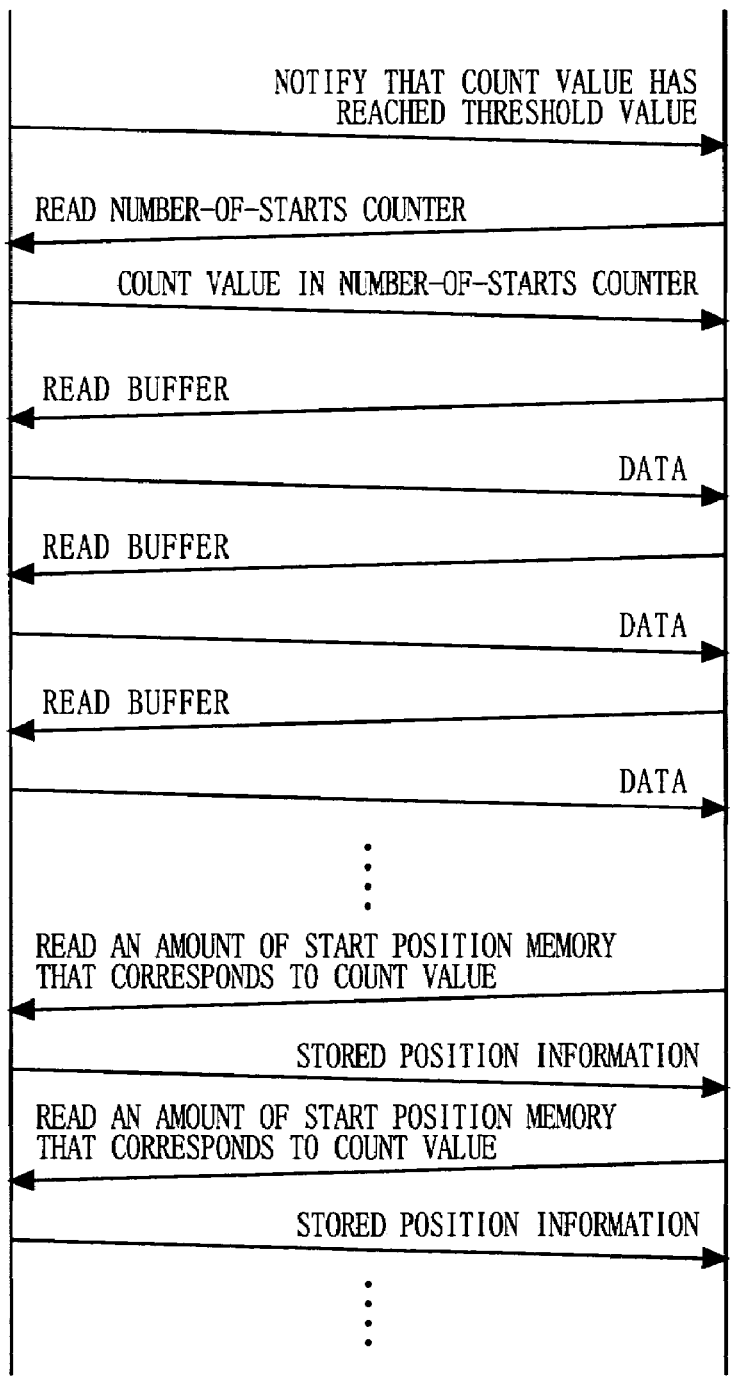

6. Sixth Technique (FIG. 10A, FIG. 10B)

The sixth technique is a variation of the fifth technique with respect to its procedure. In the sixth technique, when the timing for a process comes, first, the decode section 20 sequentially reads out the data stored in the buffer 13 from, for example, an address position designated by the read pointer (step S91, S94). Then, when the reading out of the data is completed, reference to the count number in the number-of-starts counter 16 and obtainment of the address stored in the start position memory 15 are performed (step S92, S93).

Through performing the above procedures until the decode process ends (step S95), the decode section 20 can perform the decode process of the data read out from the buffer 13, without newly performing a start position detection of the data. Note that FIG. 10B is a diagram illustrating an exemplary processing sequence according to the procedure in FIG. 10A.

As described above, through the device and method of packet processing according to an embodiment of the present invention, when the decode section 20 reads out data stored in the buffer 13, information concerning a stored position and the number of start data can be obtained independently of the reading out of the data. Therefore, there is no need for detecting a start position at the side of the decode section 20, and a reduction in decode processing load, improvement in decode processing speed, and decrease in electric power consumption can be realized.

(An Exemplary Application of MPEG2 Technique to TS Packets)

Figure 16:
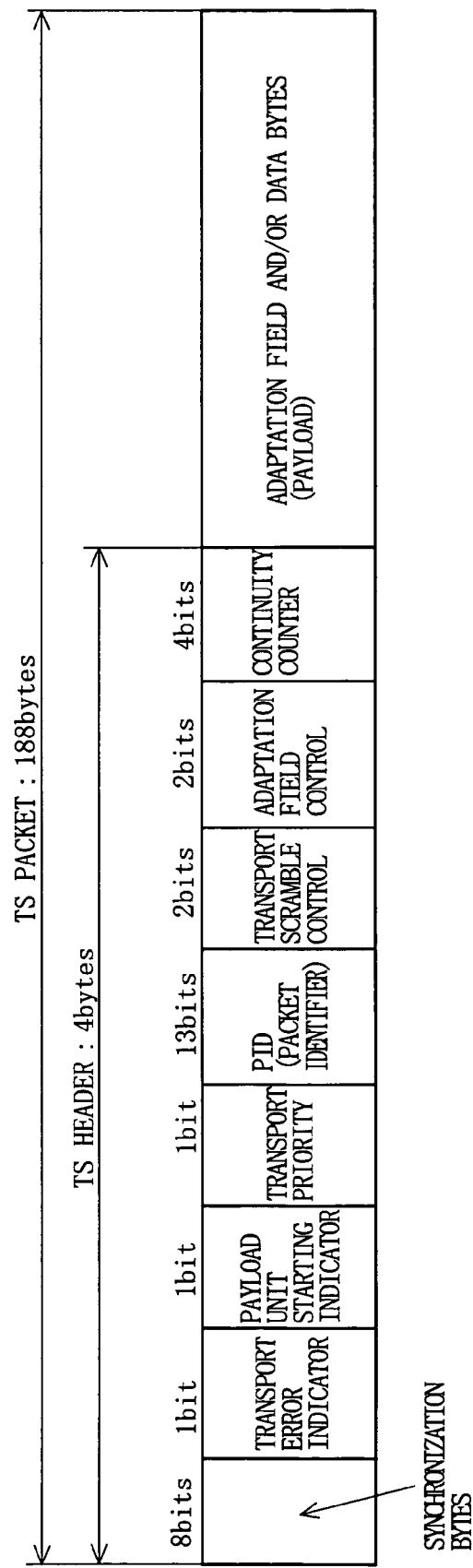
FIG. 16 is a diagram illustrating a detailed structure of a TS packet.
Figure 17:
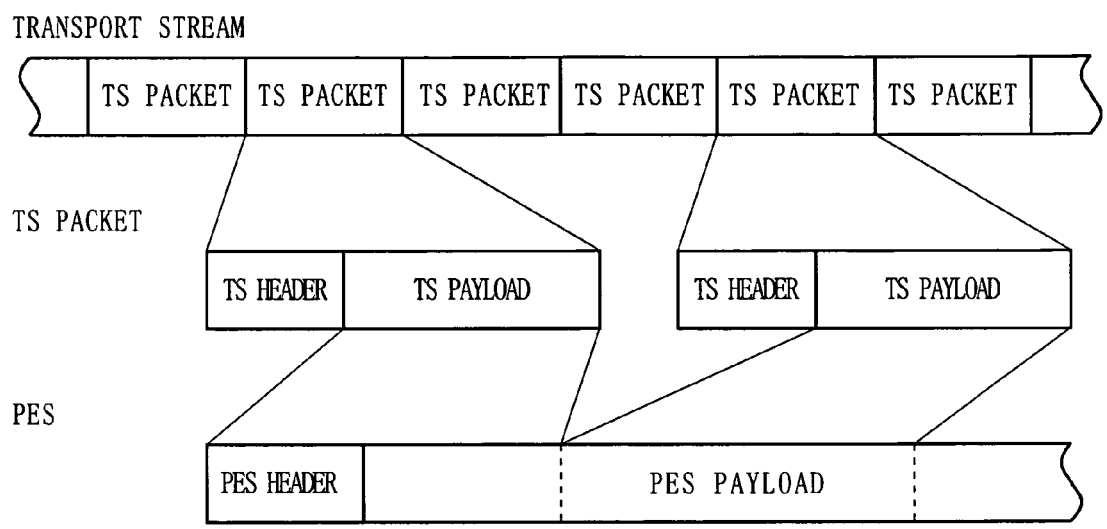
FIG. 17 is a diagram illustrating the relationship between TS packets and PES data.
Figure 18:
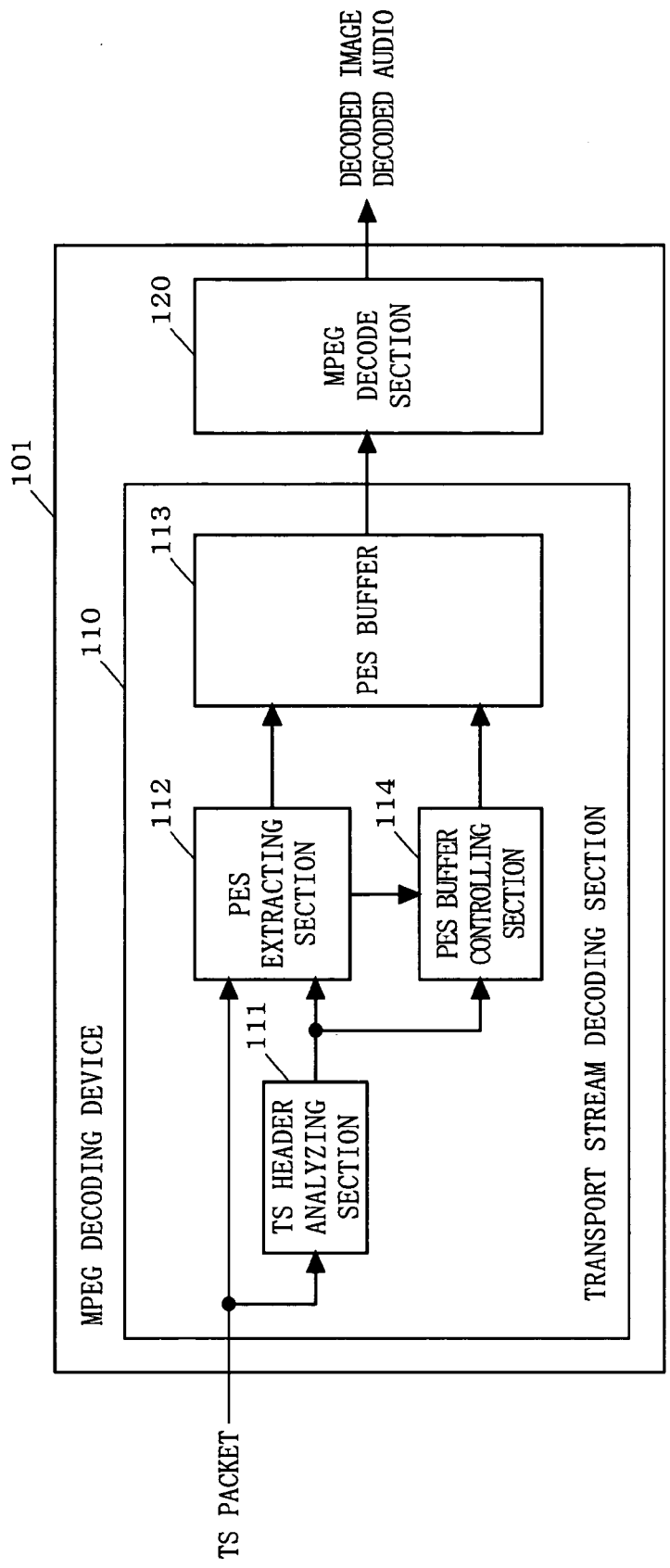
FIG. 18 is a block diagram illustrating a construction of a conventional MPEG decoding device 101.

Next, an exemplary embodiment in which the packet processing device 1 of the present invention is applied to a decode process of TS packets under MPEG2 technique will be described. It is assumed that synchronization of TS packets being inputted to the data processing section 10 has been established through detection of a synchronization byte (refer to FIG. 16) in the TS header or the like.

To the header analyzing section 11 and the data extracting section 12, TS packets under MPEG2 technique are sequentially inputted. Every time a TS packet is inputted, the header analyzing section 11 analyzes header information, namely, a TS header of the TS packet. At this time, if a payload unit starting indicator (refer to FIG. 16) is "1", the header analyzing section 11 determines that PES data containing a PES header (hereinafter referred to as start PES data) is stored in the payload of the TS packet inputted. The data extracting section 12 refers to the analysis result of the TS header from the header analyzing section 11 and extracts necessary PES data from the TS packet inputted. Then, the data extracting section 12 outputs the extracted PES data to the buffer 13 and, if start PES data is outputted, notifies so to the buffer controlling section 14. The buffer 13 stores the PES data outputted from the data extracting section 12 to a predetermined position, according to the stored position control by the buffer controlling section 14.

The start position memory 15 retains the write address of the start data on the buffer 13 which is notified by the buffer controlling section 14, as the stored position information of the start data. The number-of-starts counter 16 counts the number of start PES data having been written in the buffer 13. Specifically, when the start PES data is stored in the buffer 13, i.e., when being notified from the buffer controlling section 14, the count number in the number-of-starts counter 16 is incremented. Note that the count number in the number-of-starts counter 16 is reset when the start PES data corresponding to the count number has been read out from the buffer 13 by the decode section 20, i.e., when the start position memory 15 is referred to.

Figure 11:
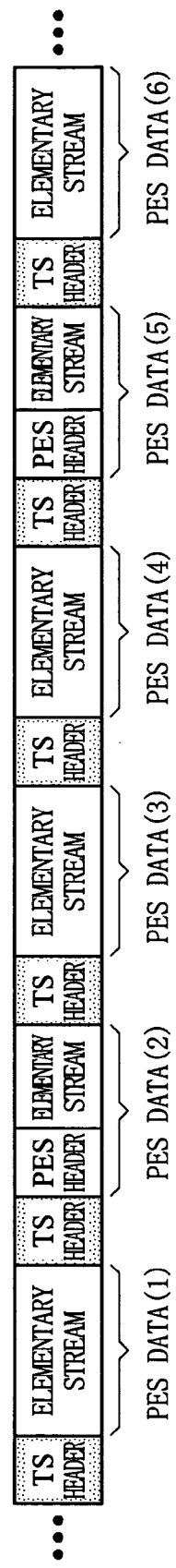
FIG. 11 is a diagram illustrating exemplary TS packets to be inputted to the packet processing device 1.
Figure 12A:
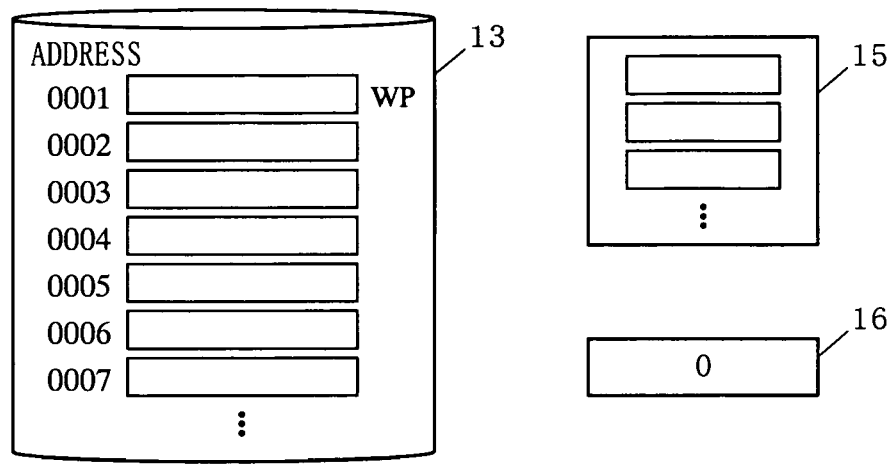
FIG. 12A to FIG. 12F are diagrams describing states of the buffer 13, the start position memory 15, and the number-of-starts counter 16, in accordance with the TS packets in FIG. 11.
Figure 12B:
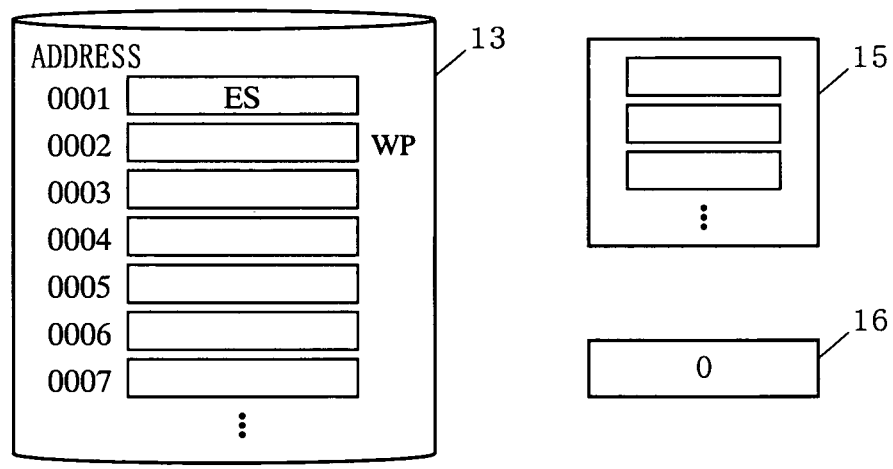
Figure 12C:
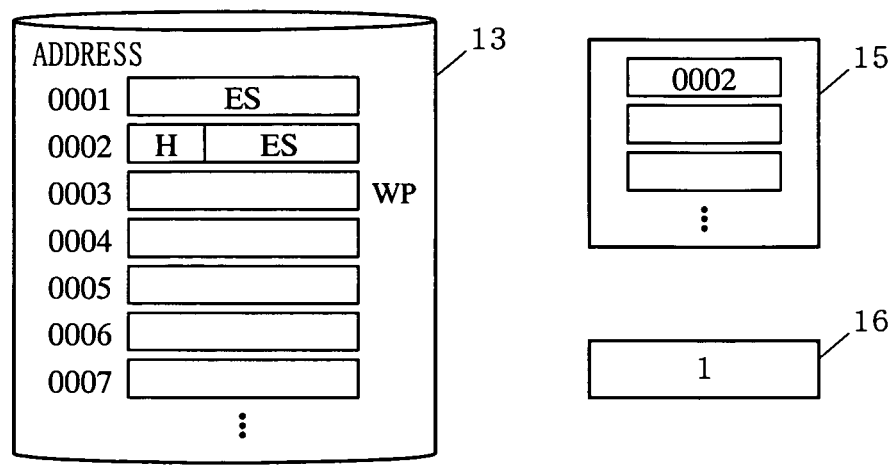
Figure 12D:
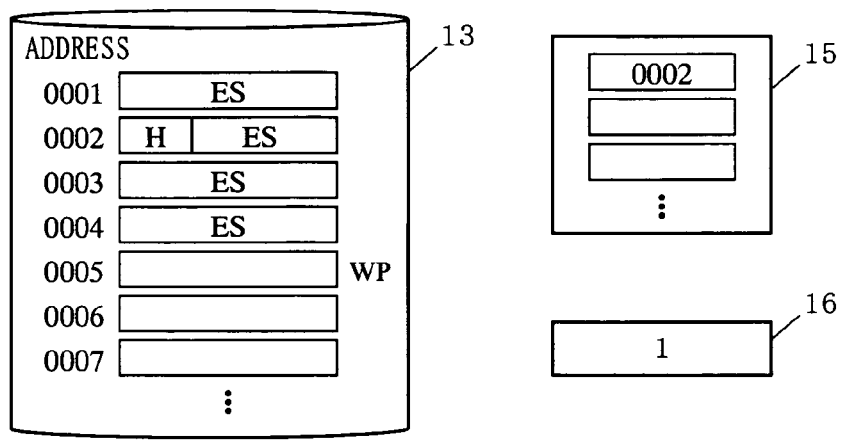
Figure 12E:
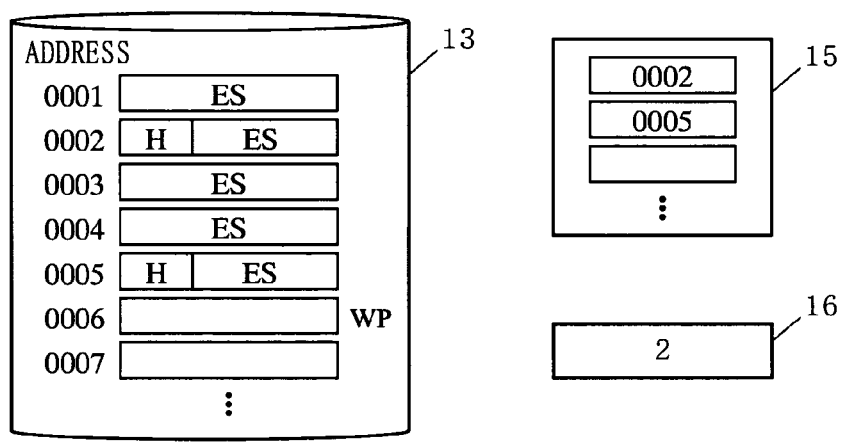
Figure 12F:
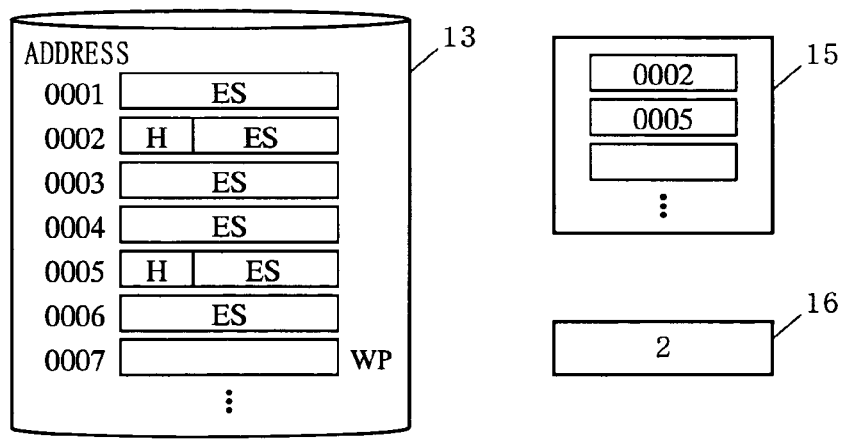

FIG. 11 is a diagram illustrating exemplary TS packets to be inputted to the packet processing device 1. FIG. 12A to FIG. 12F are diagrams describing states of the buffer 13, the start position memory 15, and the number-of-starts counter 16, in accordance with the TS packets in FIG. 11. Here, a case will be described where the TS packets shown in FIG. 11 are inputted when the states of the buffer 13, the start position memory 15, and the number-of-starts counter 16 are as shown in FIG. 12A.

PES data (1), which is extracted first, is stored to the address "0001", as designated by the write pointer in the buffer 13. Because PES data (1) is not start PES data, only a moving of the write pointer to the address "0002" is conducted (the state in FIG. 12B). Note that an elementary stream of PES data is denoted as "ES" in figures.

PES data (2), which is next extracted, is stored in the address "0002", as designated by the write pointer in the buffer 13. Because PES data (2) is start PES data, the address "0002" is retained in the start position memory 15, and the count number in the number-of-starts counter 16 is updated from "0" to "1". Thereafter, the write pointer moves to the position of the address "0003" (the state in FIG. 12C) Note that a PES header in PES data is denoted as "H" in figures.

Likewise, next-extracted PES data (3) and PES data (4), which are not start PES data, are stored in the addresses "0003" and "0004", respectively, according to the write pointer in the buffer 13. The write pointer is moved to the position of the address "0005", through this process (the state in FIG. 12D).

Furthermore, next-extracted PES data (5), which is start PES data, is stored in the address "0005", as designated by the write pointer in the buffer 13. Then, the address "0005" is additionally retained in the start position memory 15, and the count number in the number-of-starts counter 16 is updated from "1" to "2". Thereafter, the write pointer moves to the position of the address "0006" (the state in FIG. 12E).

Then, next-extracted PES data (6), which is not start PES data, is stored in the address "0006", according to the write pointer in the buffer 13. The write pointer moves to the position of the address "0007" (the state in FIG. 12F).

Figure 15:
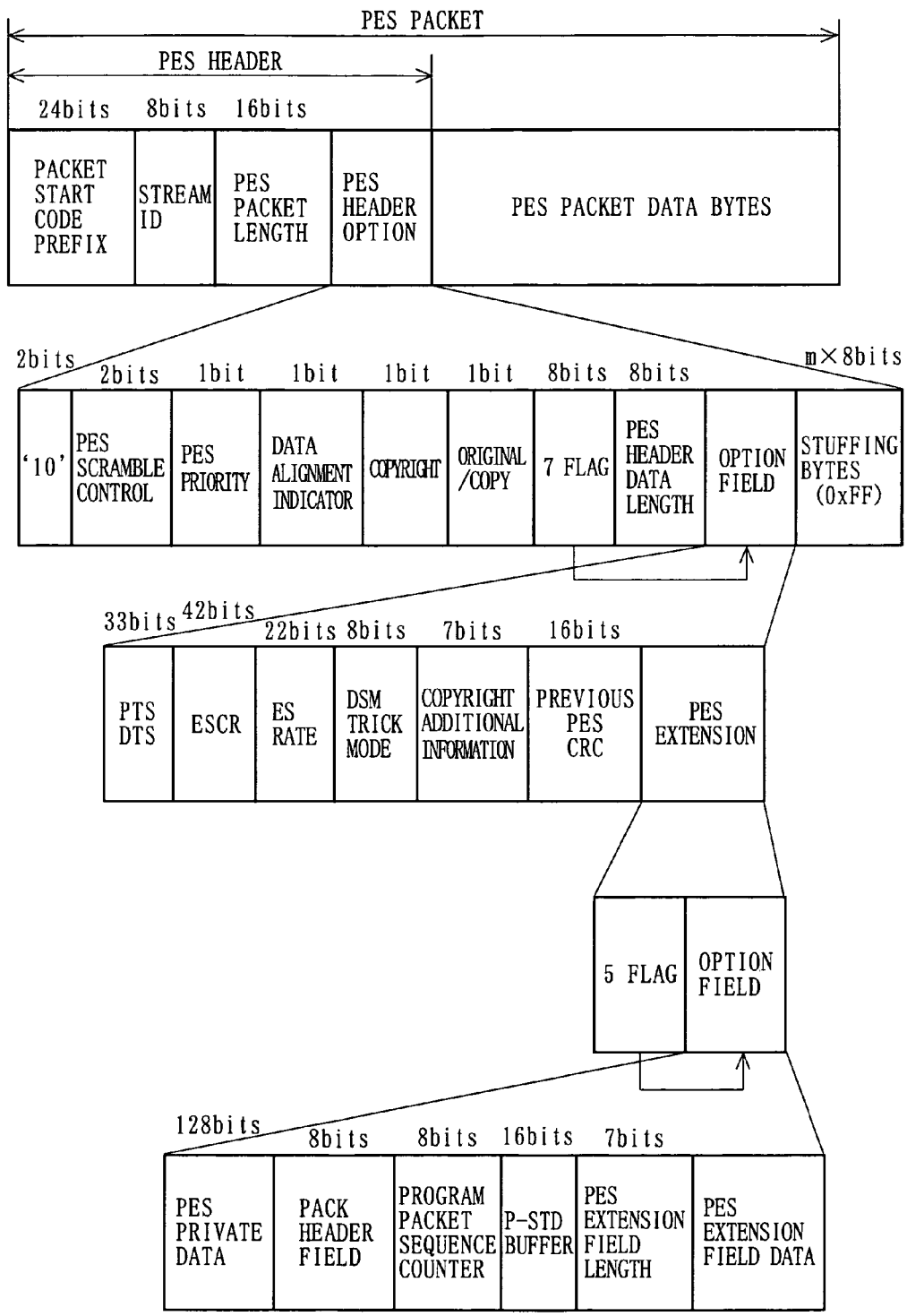
FIG. 15 is a diagram illustrating a detailed structure of a PES packet.

The operations which the decode section 20 performs are as in the aforementioned techniques, first to sixth. Note that the decode process of the elementary stream which is based on the PES header separated from the start PES data can be performed by utilizing various information (refer to FIG. 15) necessary for a MPEG decode process, such as time information (PTS: Presentation Time Stamp and DTS: Decode Time Stamp) and the like that are contained in a PES header.

As described above, the device and method of packet processing of the present invention can be applied to TS packets under MPEG2 technique.

Note that the aforementioned embodiment describes the case where an address position in the buffer 13 in which start data is stored is used as stored position information; however, information (byte number and the like) which represents a position of start data relative to the first data stored in the buffer can also be used.

Further, the aforementioned embodiment describes the case where a position in the buffer 13 in which start data is stored is identified by using the start data identifying section 17, which is composed of the start position memory 15 and the number-of-starts counter 16. However, the present invention is not limited to the construction using a memory and a counter. As long as it is a construction which can identify a stored position of start data in the buffer 13, a start data identifying section of any other construction may be used.

Figure 13:
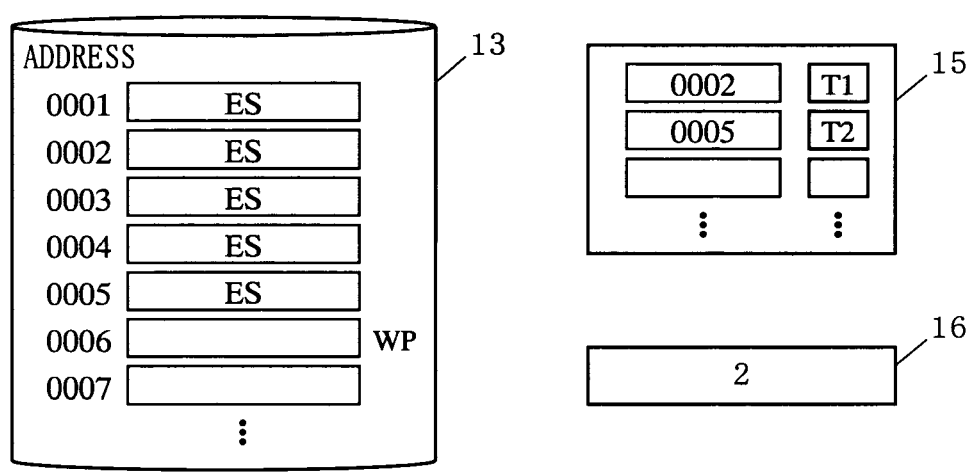
FIG. 13 is a diagram illustrating an exemplary construction of the start position memory 15, in the case where only data is stored to the buffer 13.

Furthermore, the aforementioned embodiment describes the case where both a header and data are stored in the buffer 13; however, only data may be stored. In the case of MPEG2 technique, "ES" is data. However, in this case, time information (time stamps T1, T2 . . . and so on) which is usually contained in a header and necessary for a decode process needs to be stored in the start position memory 15, in association with start data, for example. FIG. 13 is a diagram illustrating an example in which this technique is applied to the state as in FIG. 12F.

Figure 14A:
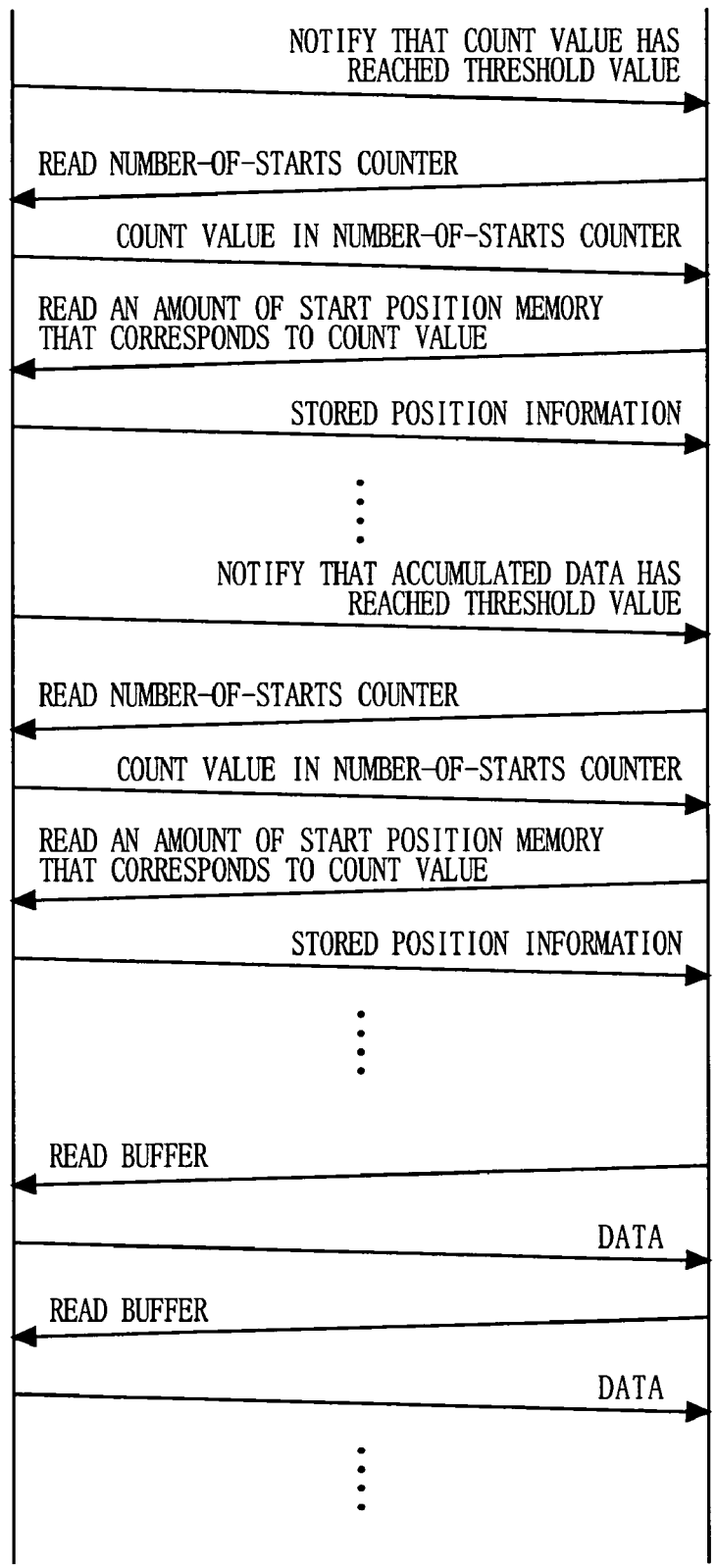
FIG. 14A is a diagram illustrating an exemplary processing sequence, in the case of employing both FIG. 7A (third technique) and FIG. 9A, the fifth technique.
Figure 14B:
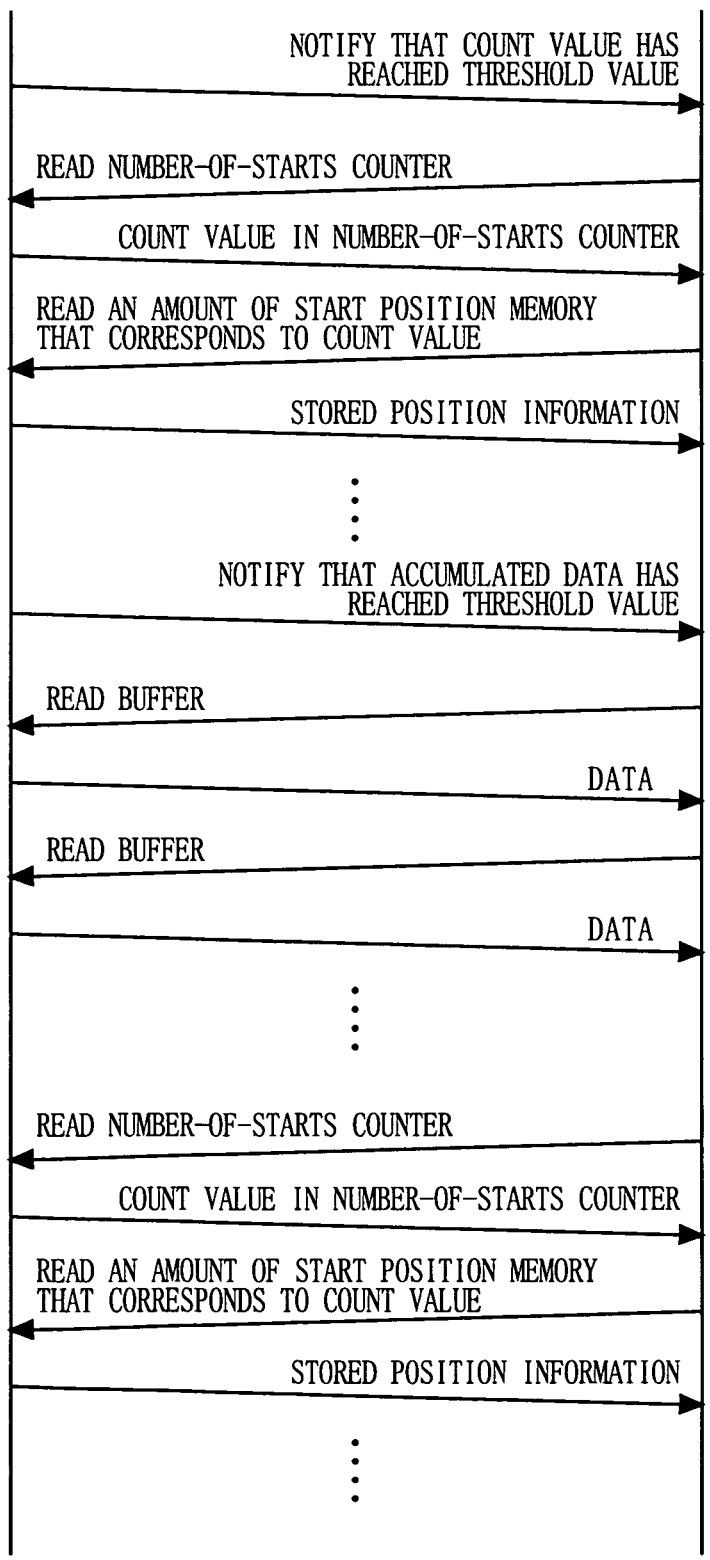
FIG. 14B is a diagram illustrating an exemplary processing sequence, in the case of employing both FIG. 8A (fourth technique) and FIG. 10A, the sixth technique.

Furthermore, in the decode section 20 according to the aforementioned embodiment is illustrated as using either the third (fourth) technique or the fifth (sixth) technique; however, both of these techniques may be used simultaneously. FIG. 14A and FIG. 14B are diagrams illustrating an exemplary processing sequence according to both procedures.

Note that among the functional blocks of the packet processing device according to the present invention, the header analyzing section 11, data extracting section 12, buffer controlling section 14, and the start data identifying section 17 may typically be realized as an LSI, which is an integrated circuit (which may be referred to as an IC, a system LSI, a super LSI, or an ultra LSI, etc., depending on the degree of integration) Each functional block may be separately constructed in a chip form, or all or some of the functional blocks may be constructed in a chip form.

Also, the method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used.

Further, in the case where another integration technology replacing LSI becomes available due to improvement of a semiconductor technology or due to the emergence of another technology derived therefrom, integration of the functional blocks may be performed using such a new integration technology. For example, biotechnology may be applied to the above-described integration.

Also note that the packet processing method according to the present invention can be realized by a CPU interpreting and executing program data, which is able to cause a CPU to execute the above-described processing steps, stored in a storage device (e.g., a ROM, a RAM, or a hard disk). In this case, the program data may be introduced into the storage device from a recording medium such as a CD-ROM or a flexible disk, or may be directly executed from the recording medium.

INDUSTRIAL APPLICABILITY

A device and method of packet processing according to the present invention can be used in the case of decoding data of packets in which variable length data is split and stored and the like; particularly, they are effective in cases where a reduction in processing load at a decoder, improvement in decode processing speed, and decrease in electric power consumption are to be realized, for example.

The invention claimed is:

1. A packet processing device for processing packets in which variable length data is split and stored, the packet processing device comprising:
   a header analyzing section for analyzing, using a processor, a header of an inputted packet and determining whether data stored in a payload is start data containing start information or other data;
   a data extracting section for referring to an analysis result from the header analyzing section and extracting the data from the payload of the packet;
   a buffer for storing the data extracted by the data extracting section;
   a buffer controlling section for controlling a stored position and an accumulated data amount of the data in the buffer;
   a start data identifying section for generating stored position information representing a position of the start data stored in the buffer and a count number representing a number of the start data stored in the buffer, as information for identifying the start data in the buffer, based on the analysis result from the header analyzing section and the controlling of the stored position and the accumulated data amount of the data in the buffer by the buffer controlling section; and
   a decode section for reading out data from the buffer with a predetermined timing, obtaining the stored position information and the count number from the start data identifying section, separating the start data contained in the data read out into start information and data based on the stored position information and the count number, and performing a decode process for the data read out based on the start information;
   wherein the buffer controlling section compares the count number against a predetermined threshold number and, when the number becomes equal to or greater than the threshold number, outputs a predetermined notification signal, and
   wherein the decode section reads out the data from the buffer with a timing of receiving the notification signal.

2. The packet processing device according to claim 1, wherein the start data identifying section comprises:
   a start position memory for retaining the stored position information representing the position of the start data stored in the buffer; and
   a number-of-starts counter for counting the number of the start data stored in the buffer.

3. The packet processing device according to claim 2, wherein the start position memory is a register for retaining the stored position information.

4. The packet processing device according to claim 2, wherein the start position memory is a memory, constructed independently of the buffer, for retaining the stored position information.

5. The packet processing device according to claim 2, wherein the stored position information is a write address in the buffer storing the start data.

6. The packet processing device according to claim 2, wherein the stored position information is information representing a position of the start data relative to first data stored in the buffer.

7. The packet processing device according to claim 2, wherein the threshold number is a number of areas in the start position memory which enables retention of the stored position information.

8. The packet processing device according to claim 1, wherein, when a transport stream packet under MPEG (Moving Picture Experts Group) technique that stores variable-length PES data is inputted,
   the header analyzing section analyzes a header of a TS (transport stream) packet in the inputted transport stream, and determines whether data stored in a payload is start PES (Packetized Elementary Stream) data containing a PBS header or other PBS data,
   the data extracting section refers to an analysis result from the header analyzing section, and extracts PBS data from the payload of the TS packet,
   the buffer stores the PES data extracted by the data extracting section,
   the buffer controlling section controls a stored position and an accumulated data amount of the PBS data in the buffer, and
   the start data identifying section generates information for identifying the start PBS data in the buffer, based on the analysis result from the header analyzing section and the controlling of the stored position and the accumulated data amount of the data in the buffer by the buffer controlling section.

9. A packet processing method for processing packets in which variable length data is split and stored, the packet processing method being performed by a processor, and comprising:
   an analysis step of analyzing, using said processor, a header of an inputted packet, and determining whether data stored in a payload is start data containing start information or other data;
   an extracting step of referring to an analysis result from the analysis step, and extracting the data from the payload of the packet;
   a step of storing the data extracted in the extracting step to a buffer;
   a control step of controlling a stored position and an accumulated data amount of the data in the buffer;
   an identifying step of generating stored position information representing a position of the start data stored in the buffer and a count number representing a number of the start data stored in the buffer, as information for identifying the start data in the buffer, based on the analysis result from the analysis step and the controlling of the stored position and the accumulated data amount of the data in the buffer from the control step;
   a step of comparing the count number against a predetermined threshold number and, when the number becomes equal to or greater than the threshold number, outputting a predetermined notification signal;
   a reading step of reading out data from the buffer with a timing of receiving the notification signal;
   a separating step of separating, based on the stored position information and the count number, the start data contained in the data read out into start information and data; and
   a decoding step of performing a decode process for the data read out based on the start information.

10. A computer readable medium having recorded thereon a computer readable program for causing a computer to execute a packet processing method for processing packets in which variable length data is split and stored, the packet processing method being performed by a processor, and comprising:

an analysis step of analyzing, using said processor, a header of an inputted packet, and determining whether data stored in a payload is start data containing start information or other data;

an extracting step of referring to an analysis result from the analysis step, and extracting the data from the payload of the packet;

a step of storing the data extracted in the extracting step to a buffer;

a control step of controlling a stored position and an accumulated data amount of the data in the buffer;

an identifying step of generating stored position information representing a position of the start data stored in the buffer and a count number representing a number of the start data stored in the buffer, as information for identifying the start data in the buffer, based on the analysis result from the analysis step and the controlling of the stored position and the accumulated data amount of the data in the buffer from the control step;

a step of comparing the count number against a predetermined threshold number and, when the number becomes equal to or greater than the threshold number, outputting a predetermined notification signal;

a reading step of reading out data from the buffer with a timing of receiving the notification signal;

a separating step of separating, based on the stored position information and the count number, the start data contained in the data read out into start information and data; and a decoding step of performing a decode process for the data read out based on the start information.

11. An integrated circuit to be incorporated into a device which processes packets in which variable length data is split and stored, wherein the device comprises a buffer for storing data, and
wherein the integrated circuit integrates circuitry functions as:

a header analyzing section for analyzing a header of an inputted packet, and determining whether data stored in a payload is start data containing start information or other data;

a data extracting section for referring to an analysis result from the header analyzing section, and extracting the data from the payload in the packet;

a buffer for storing the data extracted by the data extracting section;

a buffer controlling section for controlling a stored position and an accumulated data amount of the data in the buffer;

a start data identifying section for generating stored position information representing a position of the start data stored in the buffer and a count number representing a number of the start data stored in the buffer, as information for identifying the start data in the buffer, based on the analysis result from the header analyzing section and the controlling of the stored position and the accumulated data amount of the data in the buffer by the buffer controlling section; and a decode section for reading out data from the buffer with a predetermined timing, obtaining the stored position information and the count number from the start data identifying section, separating the start data contained in the data read out into start information and data based on the stored position information and the count number, and performing a decode process for the data read out based on the start information;

wherein the buffer controlling section compares the count number against a predetermined threshold number and, when the number becomes equal to or greater than the threshold number, outputs a predetermined notification signal, and wherein the decode section reads out the data from the buffer with a timing of receiving the notification signal.

* * * * *

UNITED STATES PATENT AND TRADEMARK OFFICE
CERTIFICATE OF CORRECTION

PATENT NO. : 7,602,801 B2
APPLICATION NO. : 10/528839
DATED : October 13, 2009
INVENTOR(S) : Shigeo Hayashi et al.

It is certified that error appears in the above-identified patent and that said Letters Patent is hereby corrected as shown below:

In column 14, claim 8, line 9, "containing a PBS header or other PBS data," should read --containing a PES header or other PES data,--.

In column 14, claim 8, line 11, "and extracts PBS data from" should read --and extracts PES data from--.

In column 14, claim 8, line 16, "data amount of the PBS data in the" should read --data amount of the PES data in the--.

In column 14, claim 8, line 19, "the start PBS data in the buffer," should read --the start PES data in the buffer--.

Signed and Sealed this

Nineteenth Day of January, 2010

David J. Kappos
*Director of the United States Patent and Trademark Office*